United States Patent
Uragami et al.

(10) Patent No.: US 12,460,977 B2
(45) Date of Patent: Nov. 4, 2025

(54) LOAD SENSOR

(71) Applicant: Panasonic Intellectual Property Management Co., Ltd., Osaka (JP)

(72) Inventors: Susumu Uragami, Osaka (JP); Hiroyuki Furuya, Osaka (JP); Yuta Moriura, Osaka (JP); Takashi Matsumoto, Osaka (JP); Hironobu Ukitsu, Osaka (JP); Yodai Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 288 days.

(21) Appl. No.: 18/329,391

(22) Filed: Jun. 5, 2023

(65) Prior Publication Data

US 2023/0314242 A1 Oct. 5, 2023

Related U.S. Application Data

(63) Continuation of application No. PCT/JP2021/040826, filed on Nov. 5, 2021.

(30) Foreign Application Priority Data

Dec. 7, 2020 (JP) ................................. 2020-203051

(51) Int. Cl.
*G01L 1/14* (2006.01)

(52) U.S. Cl.
CPC .............. *G01L 1/142* (2013.01); *G01L 1/146* (2013.01)

(58) Field of Classification Search
CPC . G01L 1/14; G01L 1/142; G01L 1/146; G01L 5/00
See application file for complete search history.

(56) References Cited

U.S. PATENT DOCUMENTS

| | | |
|---|---|---|
| 2015/0276531 A1 | 10/2015 | Matsuhiro et al. |
| 2015/0355039 A1 | 12/2015 | Duchaine et al. |
| 2019/0277713 A1 | 9/2019 | Moriura et al. |

FOREIGN PATENT DOCUMENTS

| | | | | |
|---|---|---|---|---|
| JP | 2015-187561 A | | 10/2015 | |
| JP | 2020071061 A | * | 5/2020 | ............... G01L 1/14 |
| WO | 2018/096901 A1 | | 5/2018 | |

OTHER PUBLICATIONS

International Search Report issued in corresponding International Patent Application No. PCT/JP2021/040826, dated Jan. 18, 2022, with English translation.

* cited by examiner

*Primary Examiner* — Benjamin R Schmitt
(74) *Attorney, Agent, or Firm* — Rimon P.C.

(57) ABSTRACT

A load sensor includes: a first base member and a second base member disposed so as to face each other; an electrically-conductive elastic body disposed on an opposing face of the first base member; an electrically-conductive member disposed between the second base member and the electrically-conductive elastic body; a dielectric body disposed between the electrically-conductive elastic body and the electrically-conductive member; and a component configured to change a contact area of the dielectric body in association with increase in a load, such that a form of change in capacitance between the electrically-conductive elastic body and the electrically-conductive member associated with change in the load becomes close to that of a straight line.

20 Claims, 14 Drawing Sheets

EMBODIMENT 1

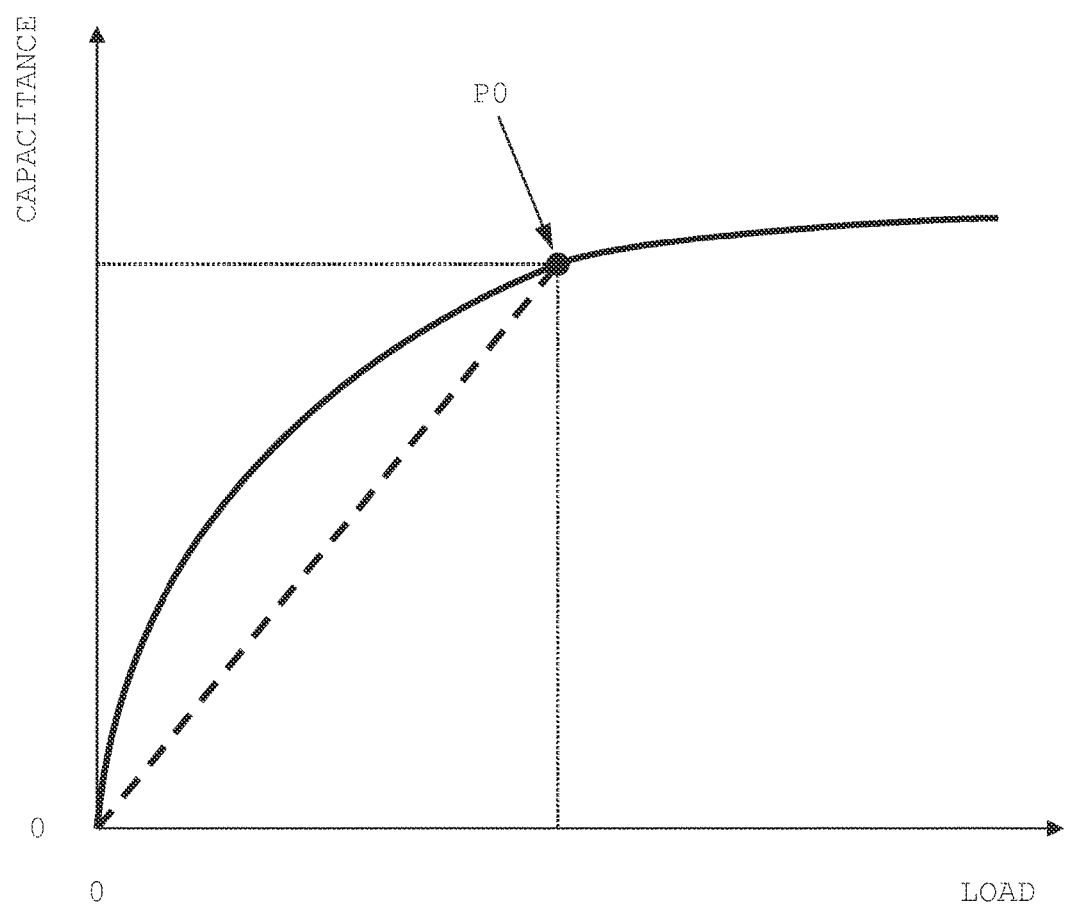

FIG. 7A
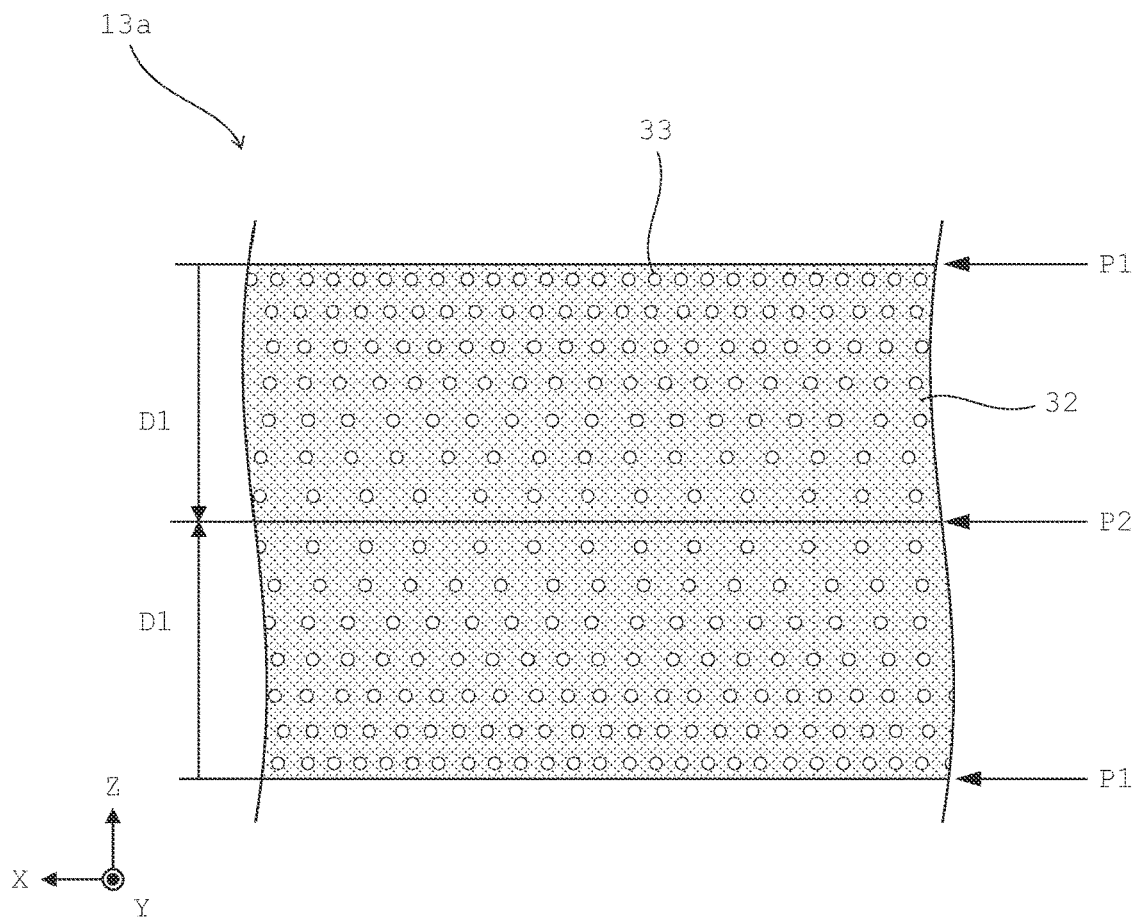
FIG. 7B  MODIFICATION OF EMBODIMENT 1
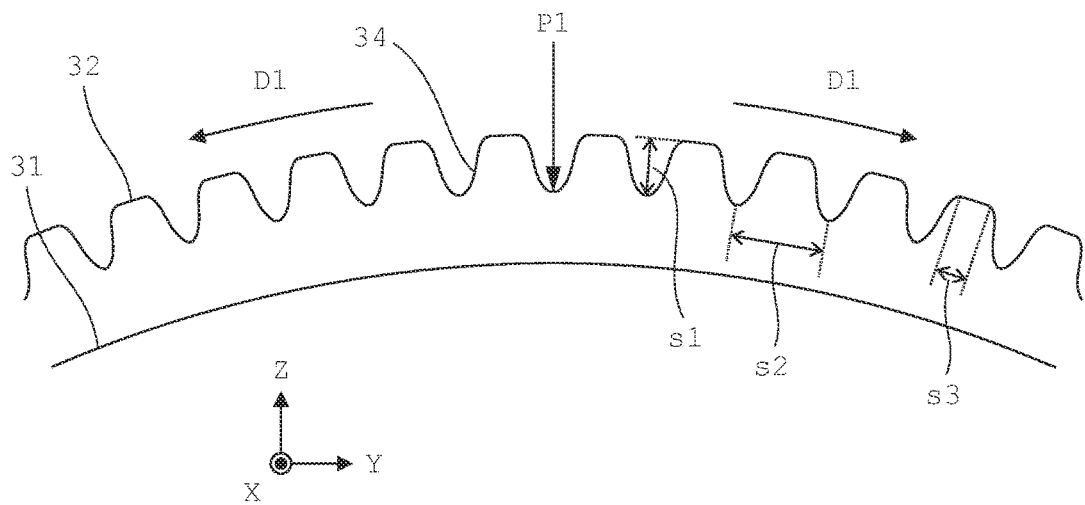

*FIG. 8A*    EMBODIMENT 2
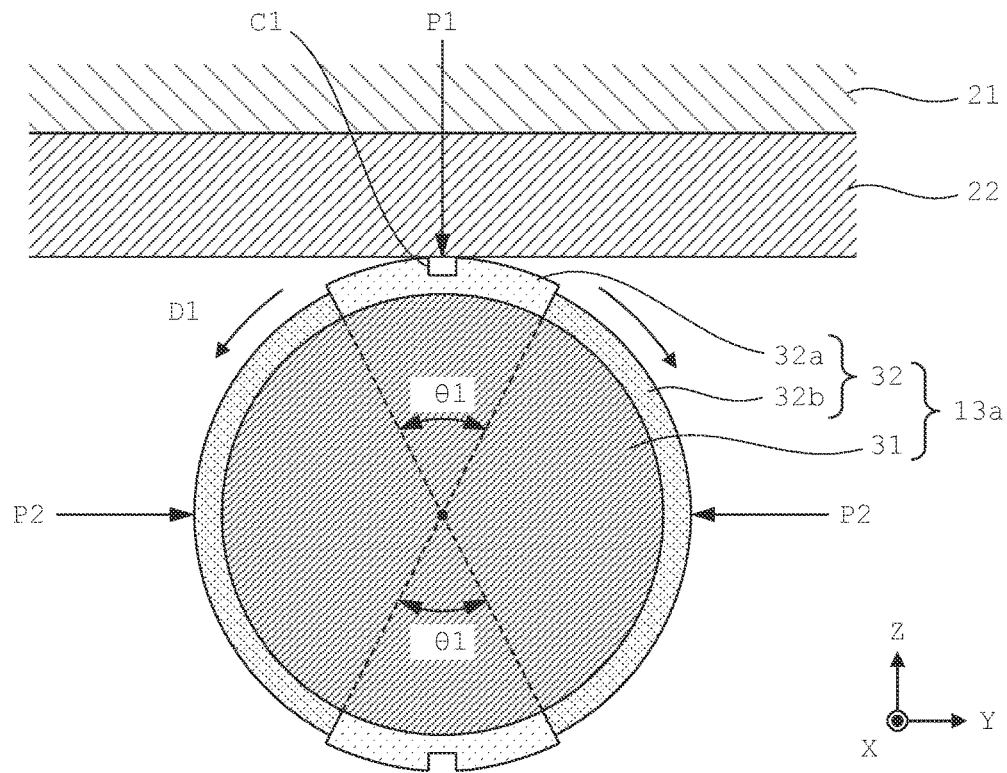
*FIG. 8B*
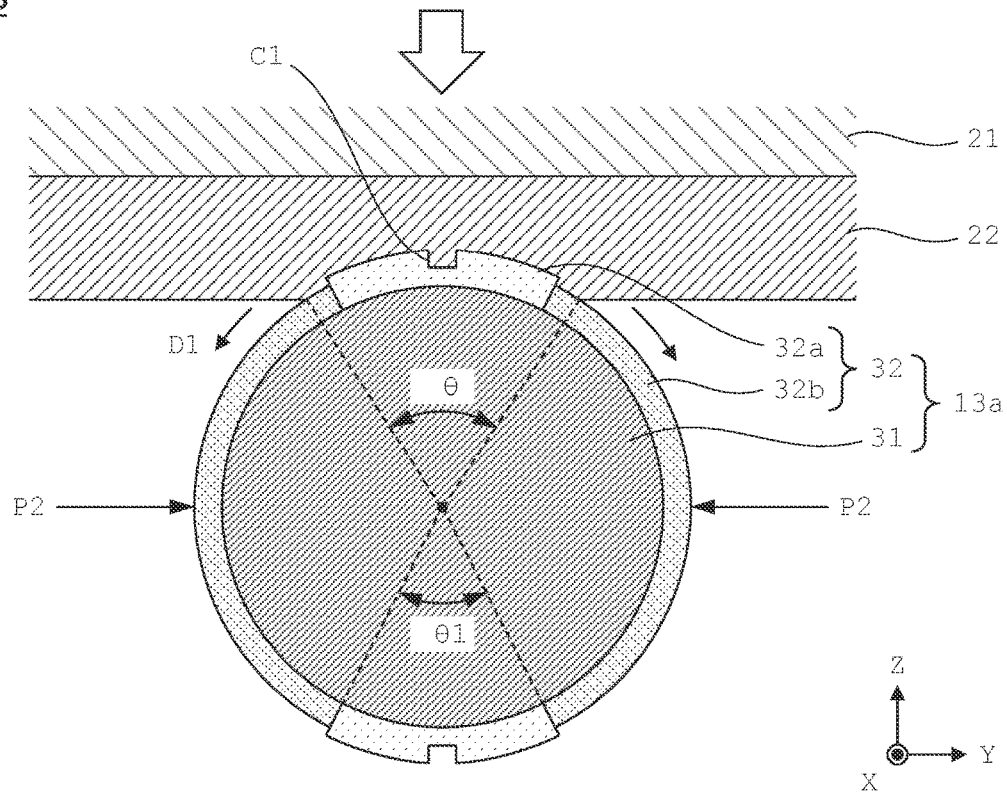

FIG.10   MODIFICATION 1 OF EMBODIMENT 2
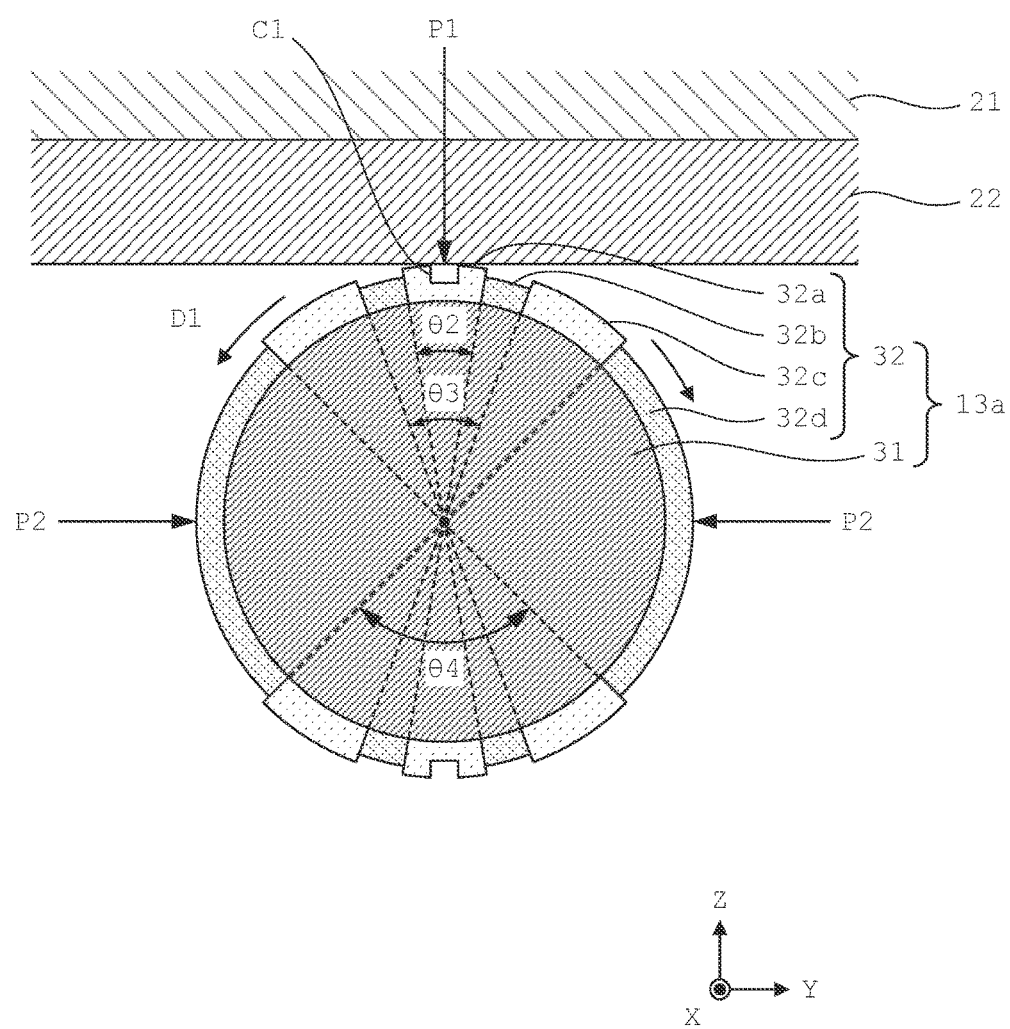

FIG.12   MODIFICATION 2 OF EMBODIMENT 2
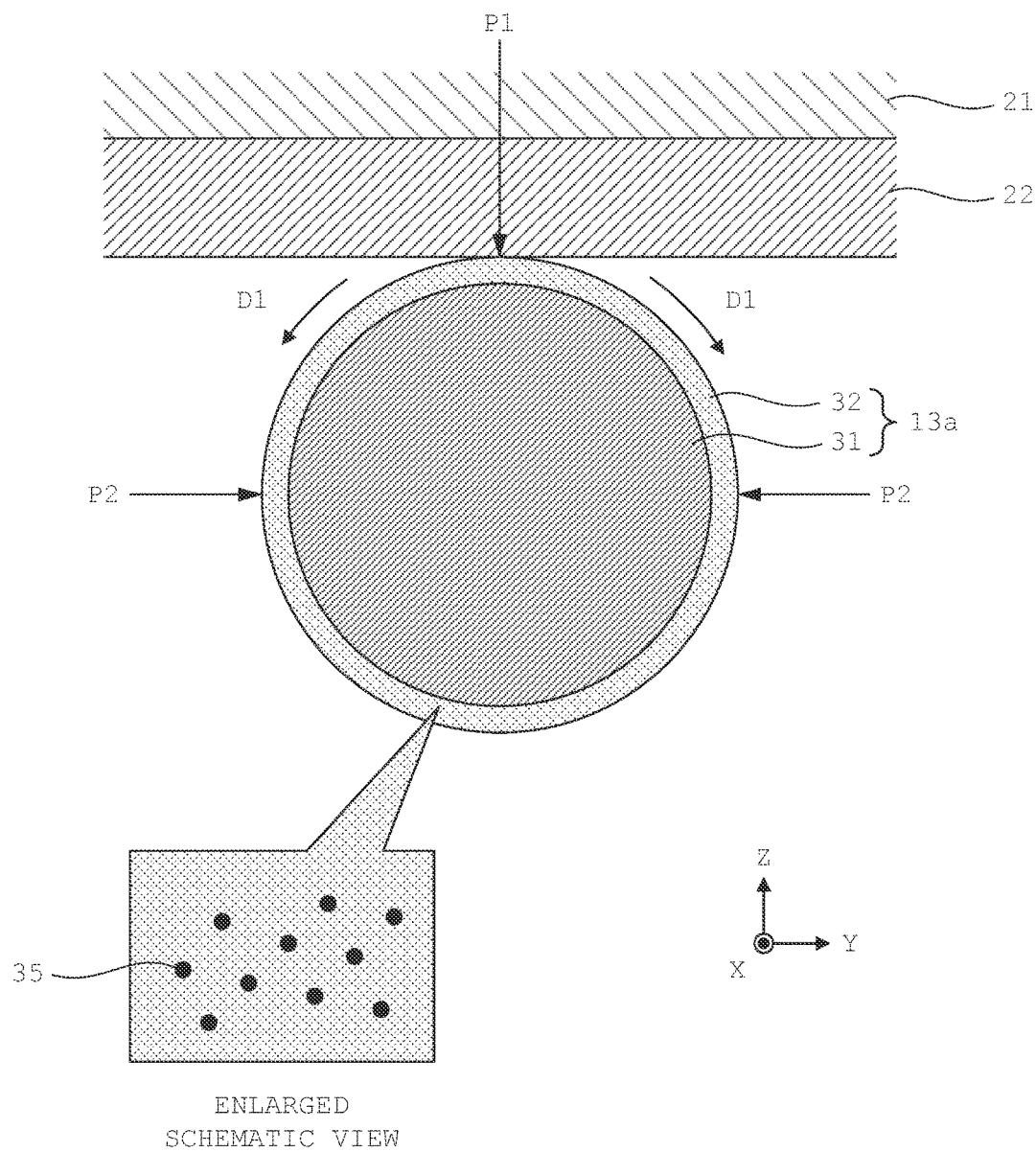

EMBODIMENT 3

FIG.14A                                   EMBODIMENT 4
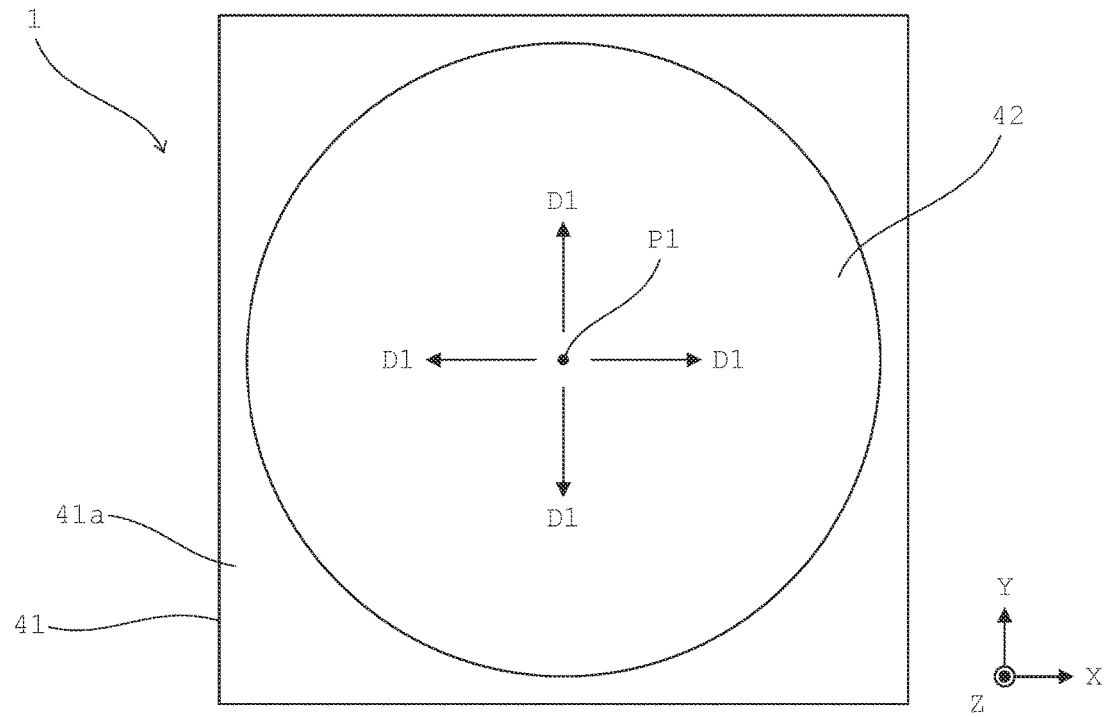
FIG.14B
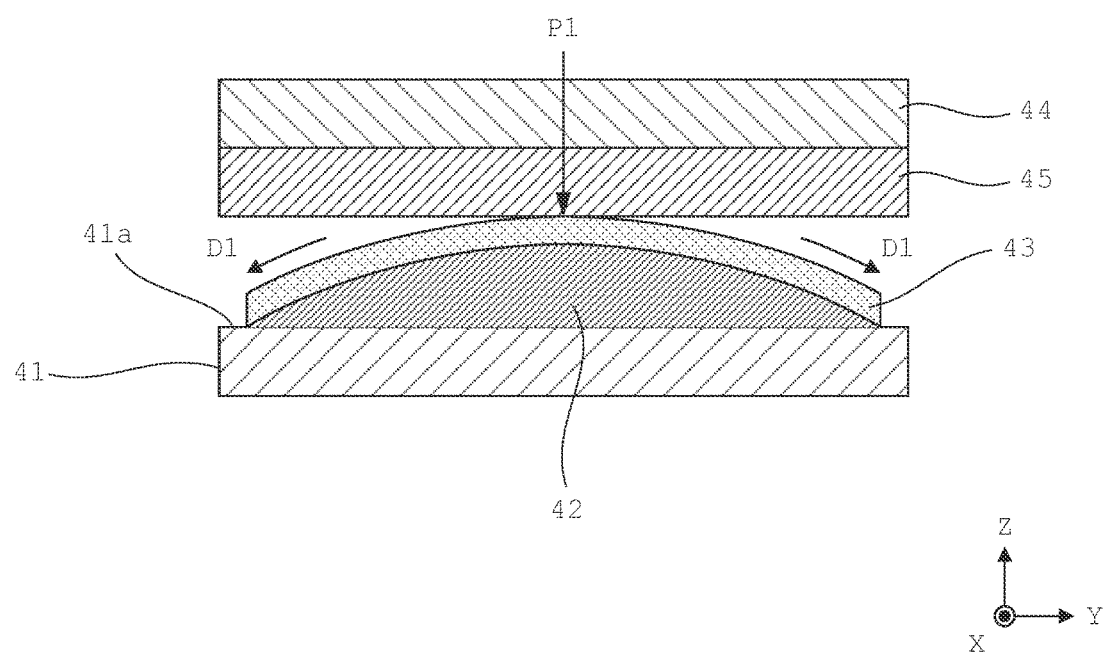

LOAD SENSOR

CROSS REFERENCE TO RELATED APPLICATION

This application is a continuation of International Application No. PCT/JP2021/040826 filed on Nov. 5, 2021, entitled "LOAD SENSOR", which claims priority under 35 U.S.C. Section 119 of Japanese Patent Application No. 2020-203051 filed on Dec. 7, 2020, entitled "LOAD SENSOR". The disclosures of the above applications are incorporated herein by reference.

BACKGROUND OF THE INVENTION

Field of the Invention

The present invention relates to a load sensor that detects a load applied from outside, based on change in capacitance.

Description of Related Art

Load sensors are widely used in the fields of industrial apparatuses, robots, vehicles, and the like. In recent years, in accordance with advancement of control technologies by computers and improvement of design, development of electronic apparatuses that use a variety of free-form surfaces such as those in human-form robots and interior equipment of automobiles is in progress. In association therewith, it is required to mount a high performance load sensor to each free-form surface.

International Publication No. 2018/096901 describes a pressure-sensitive element that includes: a first electrically-conductive member formed from a sheet-shaped electrically-conductive rubber; a second electrically-conductive member sandwiched by the first electrically-conductive member and a base member; and a dielectric body formed so as to cover the second electrically-conductive member. In this configuration, in association with increase in a load, the contact area between the first electrically-conductive member and the dielectric body increases, and in association therewith, capacitance between the first electrically-conductive member and the second electrically-conductive member increases. Therefore, when the value of capacitance between the first electrically-conductive member and the second electrically-conductive member is detected, the load applied to the pressure-sensitive element can be detected.

However, in the above configuration, the second electrically-conductive member has a linear shape. Thus, the contact area does not increase in accordance with increase in the load, and the relationship between the load and the capacitance is defined by a curved wave shape. Therefore, when the load is obtained from the value of the capacitance, this wave shape needs to be taken into consideration. This causes a problem that the process of detecting the load becomes complicated.

SUMMARY OF THE INVENTION

An aspect of the present invention relates to a load sensor. A load sensor according to the present aspect includes: a first base member and a second base member disposed so as to face each other; an electrically-conductive elastic body disposed on an opposing face of the first base member; an electrically-conductive member disposed between the second base member and the electrically-conductive elastic body; a dielectric body disposed between the electrically-conductive elastic body and the electrically-conductive member; and a component configured to change a contact area of the dielectric body in association with increase in a load, such that a form of change in capacitance between the electrically-conductive elastic body and the electrically-conductive member associated with change in the load becomes close to that of a straight line.

According to the load sensor of the present aspect, the form of change in the capacitance between the electrically-conductive elastic body and the electrically-conductive member associated with change in the load is made close to that of a straight line. Therefore, when the value of the capacitance between the electrically-conductive elastic body and the electrically-conductive member is measured and a simple process based on a proportionality is applied to the measured value of the capacitance, the load applied to the load sensor can be appropriately detected. Accordingly, the load applied to the load sensor can be detected in a simpler manner.

The effects and the significance of the present invention will be further clarified by the description of the embodiments below. However, the embodiments below are merely examples for implementing the present invention. The present invention is not limited to the embodiments below in any way.

BRIEF DESCRIPTION OF THE DRAWINGS

FIG. 5 is a graph schematically showing a relationship between load and capacitance, according to Embodiment 1;

FIG. 7A is a side view schematically showing a configuration of the conductor wire viewed in a Y-axis negative direction, according to Embodiment 1;

FIG. 7B is a diagram schematically showing a cross section of the dielectric body cut along a Y-Z plane, according to a modification of Embodiment 1;

FIG. 8A is a diagram schematically showing a relationship between the dielectric body and the electrically-con ductive elastic body in an initial state before a load is applied, according to Embodiment 2;

FIG. 8B is a diagram schematically showing a relationship between the dielectric body and the electrically-conductive elastic body in a state where a load is applied, according to Embodiment 2;

FIG. 10 is a diagram schematically showing a relationship between the dielectric body and the electrically-conductive elastic body in an initial state before a load is applied, according to Modification 1 of Embodiment 2;

FIG. 12 is a diagram schematically showing a relationship between the dielectric body and the electrically-conductive elastic body in an initial state before a load is applied, according to Modification 2 of Embodiment 2;

FIG. 14A is a plan view schematically showing a configuration of the load sensor viewed in the Z-axis negative direction, according to Embodiment 4; and FIG. 14B is a diagram schematically showing a cross section of the load sensor along a Y-Z plane, according to Embodiment 4.

Figure 1A:
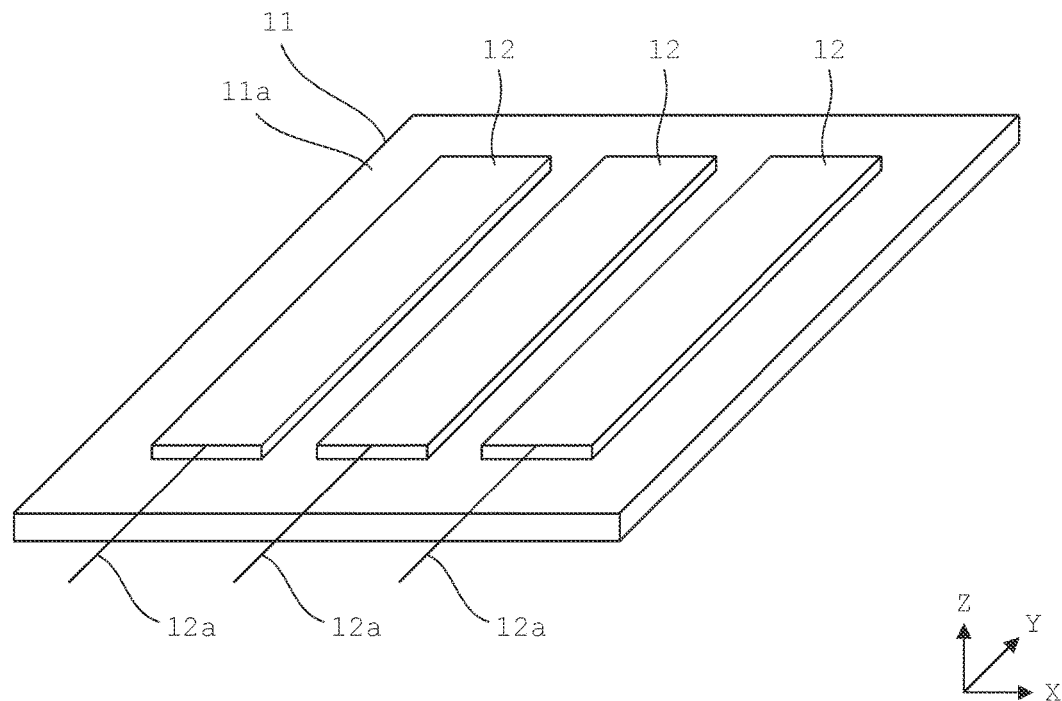
FIG. 1A is a perspective view schematically showing a base member on the lower side and electrically-conductive elastic bodies set on an opposing face of the base member on the lower side, according to Embodiment 1.

It is noted that the drawings are solely for description and do not limit the scope of the present invention in any way.

DETAILED DESCRIPTION

The load sensor according to the present invention is applicable to a load sensor of a management system or an electronic apparatus that performs processing in accordance with an applied load.

Examples of the management system include a stock management system, a driver monitoring system, a coaching management system, a security management system, and a caregiving/nursing management system.

In the stock management system, for example, by a load sensor provided to a stock shelf, the load of a placed stock is detected, and the kinds of commodities and the number of commodities present on the stock shelf are detected. Accordingly, in a store, a factory, a warehouse, and the like, the stock can be efficiently managed, and manpower saving can be realized. In addition, by a load sensor provided in a refrigerator, the load of food in the refrigerator is detected, and the kinds of the food and the quantity and amount of the food in the refrigerator are detected. Accordingly, a menu that uses food in a refrigerator can be automatically proposed.

In the driver monitoring system, by a load sensor provided to a steering device, the distribution of a load (e.g., gripping force, grip position, tread force) applied to the steering device by a driver is monitored, for example. In addition, by a load sensor provided to a vehicle-mounted seat, the distribution of a load (e.g., the position of the center of gravity) applied to the vehicle-mounted seat by the driver in a seated state is monitored. Accordingly, the driving state (sleepiness, mental state, and the like) of the driver can be fed back.

In the coaching management system, for example, by a load sensor provided to the bottom of a shoe, the load distribution at a sole is monitored. Accordingly, correction or guidance to an appropriate walking state or running state can be realized.

In the security management system, for example, by a load sensor provided to a floor, the load distribution is detected when a person passes, and the body weight, stride, passing speed, shoe sole pattern, and the like are detected. Accordingly, the person who has passed can be identified by checking these pieces of detection information against data.

In the caregiving/nursing management system, for example, by load sensors provided to bedclothes and a toilet seat, the distributions of loads applied by a human body to the bedclothes and the toilet seat are monitored. Accordingly, at the positions of the bedclothes and the toilet seat, what action the person is going to take is estimated, whereby tumbling or falling can be prevented.

Examples of the electronic apparatus include a vehicle-mounted apparatus (car navigation system, audio apparatus, etc.), a household electrical appliance (electric pot, IH cooking heater, etc.), a smartphone, an electronic paper, an electronic book reader, a PC keyboard, a game controller, a smartwatch, a wireless earphone, a touch panel, an electronic pen, a penlight, lighting clothes, and a musical instrument. In an electronic apparatus, a load sensor is provided to an input part that receives an input from a user.

The load sensors in the embodiments below are each a capacitance-type load sensor that is typically provided in a load sensor of a management system or an electronic apparatus as described above. Such a load sensor may be referred to as a "capacitance-type pressure-sensitive sensor element", a "capacitive pressure detection sensor element", a "pressure-sensitive switch element", or the like. The load sensor in the embodiments below is connected to a detection circuit, and the load sensor and the detection circuit form a load detection device. The embodiments below are examples of embodiments of the present invention, and the present invention is not limited to the embodiments below in any way.

Hereinafter, embodiments of the present invention will be described with reference to the drawings. For convenience, X-, Y-, and Z-axes orthogonal to each other are indicated in the drawings. The Z-axis direction is the height direction of a load sensor 1.

Embodiment 1

FIG. 1A is a perspective view schematically showing a base member 11, and three electrically-conductive elastic bodies 12 set on an opposing face 11a (the face on the Z-axis positive side) of the base member 11.

The base member 11 is an insulative member having elasticity, and has a flat plate shape parallel to an X-Y plane. The base member 11 is formed from a non-electrically-conductive resin material or a non-electrically-conductive rubber material.

The resin material used in the base member 11 is a resin material of at least one type selected from the group consisting of a styrene-based resin, a silicone-based resin (e.g., polydimethylpolysiloxane (PDMS)), an acrylic resin, a rotaxane-based resin, a urethane-based resin, and the like, for example. The rubber material used in the base member 11 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive elastic bodies 12 are formed on the opposing face 11a (the face on the Z-axis positive side) of the base member 11. In FIG. 1A, three electrically-conductive elastic bodies 12 are formed on the opposing face 11a of the base member 11. Each electrically-conductive elastic body 12 is an electrically-conductive member having elasticity. The electrically-conductive elastic bodies 12 each have a band-like shape that is long in the Y-axis direction, and are formed so as to be arranged with a predetermined interval therebetween in the X-axis direction. At an end portion on the Y-axis negative side of each electrically-conductive elastic body 12, a cable 12a electrically connected to the electrically-conductive elastic body 12 is set.

Each electrically-conductive elastic body 12 is formed on the opposing face 11a of the base member 11 by a printing method such as screen printing, gravure printing, flexographic printing, offset printing, or gravure offset printing. With these printing methods, the electrically-conductive elastic body 12 can be formed so as to have a thickness of about 0.001 mm to 0.5 mm on the opposing face 11a of the base member 11. However, the method for forming the electrically-conductive elastic body 12 is not limited to the printing methods.

Each electrically-conductive elastic body 12 is formed from a resin material and an electrically-conductive filler dispersed therein, or from a rubber material and an electrically-conductive filler dispersed therein.

Similar to the resin material used in the base member 11 described above, the resin material used in the electrically-conductive elastic body 12 is a resin material of at least one type selected from the group consisting of a styrene-based resin, a silicone-based resin (polydimethylpolysiloxane (e.g., PDMS)), an acrylic resin, a rotaxane-based resin, a urethane-based resin, and the like, for example. Similar to the rubber material used in the base member 11 described above, the rubber material used in the electrically-conductive elastic body 12 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive filler used in the electrically-conductive elastic body 12 is a material of at least one type selected from the group consisting of: metal materials such as Au (gold), Ag (silver), Cu (copper), C (carbon), ZnO (zinc oxide), $In_2O_3$ (indium oxide (III)), and $SnO_2$ (tin oxide (IV)); electrically-conductive macromolecule materials such as PEDOT:PSS (i.e., a complex composed of poly(3,4-ethylenedioxythiophene) (PEDOT) and polystyrene sulfonate (PSS)); electrically-conductive fibers such as a metal-coated organic matter fiber and a metal wire (fiber state); and the like, for example.

Figure 1B:
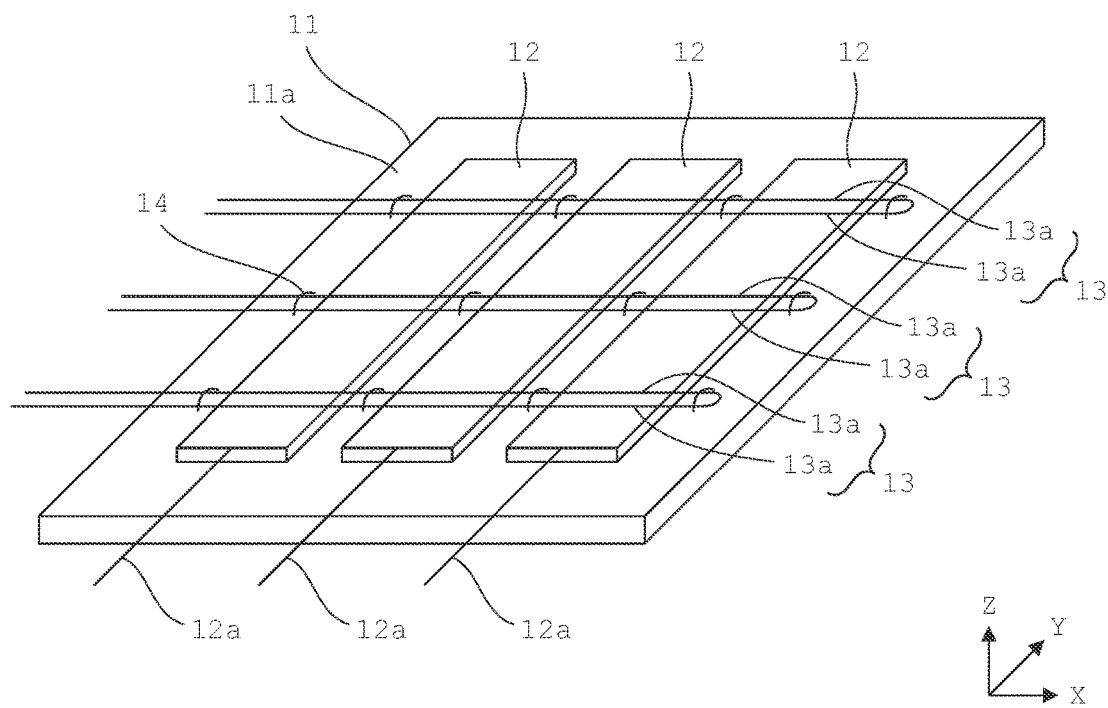
FIG. 1B is a perspective view schematically showing a state where conductor wires are set on the base member, according to Embodiment 1.

FIG. 1B is a perspective view schematically showing a state where three pairs of conductor wires 13 are set on the base member 11.

Each pair of conductor wires 13 is formed by bending one conductor wire extending in the X-axis direction, and includes two conductor wires 13a extending from the bent position toward the X-axis negative direction. Two conductor wires 13a forming a pair of conductor wires 13 are disposed so as to be arranged with a predetermined interval therebetween. The pair of conductor wires 13 are disposed so as to be superposed on the upper faces of the three electrically-conductive elastic bodies 12 shown in FIG. 1A. Here, three pairs of conductor wires 13 are disposed so as to be superposed on the upper faces of the three electrically-conductive elastic bodies 12.

The three pairs of conductor wires 13 are disposed so as to cross the electrically-conductive elastic bodies 12, and are disposed so as to be arranged with a predetermined interval therebetween, along the longitudinal direction (the Y-axis direction) of the electrically-conductive elastic bodies 12. Each pair of conductor wires 13 is disposed, extending in the X-axis direction, so as to extend across the three electrically-conductive elastic bodies 12. Each conductor wire 13a includes an electrically-conductive member having a linear shape, and a dielectric body formed on the surface of the electrically-conductive member. The configuration of the conductor wire 13a will be described later with reference to FIGS. 3A, 3B.

After the three pairs of conductor wires 13 have been disposed as in FIG. 1B, each pair of conductor wires 13 is set on the base member 11 by threads 14 so as to be movable in the direction (the X-axis direction) in which the pair of conductor wires 13 extends. In the example shown in FIG. 1B, twelve threads 14 set the pairs of conductor wires 13 to the base member 11 at positions other than the positions where the electrically-conductive elastic bodies 12 and the pairs of conductor wires 13 overlap each other. Each thread 14 is implemented by a chemical fiber, a natural fiber, a mixed fiber of the chemical fiber and the natural fiber, or the like.

Figure 2A:
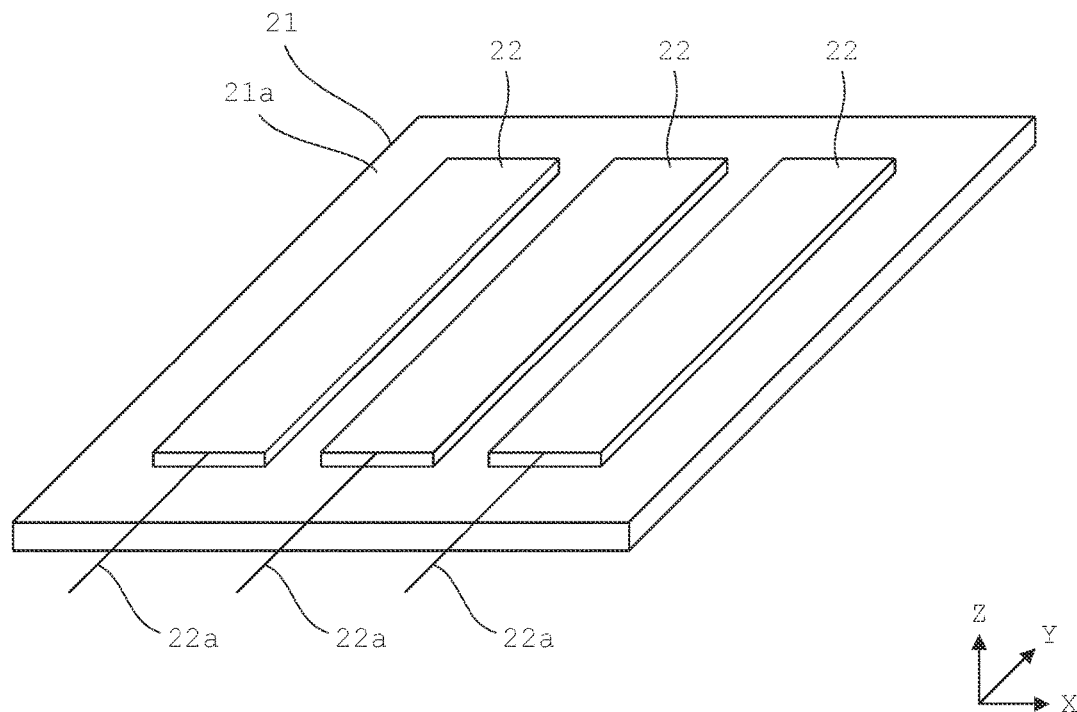
FIG. 2A is a perspective view schematically showing a base member on the upper side and electrically-conductive elastic bodies set on an opposing face of the base member on the upper side, according to Embodiment 1.

FIG. 2A is a perspective view schematically showing a base member 21 disposed so as to be superposed on the upper side of the base member 11, and three electrically-conductive elastic bodies 22 set on an opposing face 21a (the face on the Z-axis negative side) of the base member 21.

The base member 21 has the same size and shape as those of the base member 11, and is formed from the same material as that of the base member 11. The electrically-conductive elastic bodies 22 are formed, on the opposing face 21a (the face on the Z-axis negative side) of the base member 21, at positions opposing the electrically-conductive elastic bodies 12, and are formed so as to be arranged with a predetermined interval therebetween in the X-axis direction. Each electrically-conductive elastic body 22 has the same size and shape as those of the electrically-conductive elastic body 12, and is formed from the same material as that of the electrically-conductive elastic body 12. Similar to the electrically-conductive elastic body 12, the electrically-conductive elastic body 22 is formed on the face on the Z-axis negative side of the base member 21 by a predetermined printing method. The method for forming the electrically-conductive elastic body 22 is not limited to the printing methods, either. At an end portion on the Y-axis negative side of each electrically-conductive elastic body 22, a cable 22a electrically connected to the electrically-conductive elastic body 22 is set.

Figure 2B:
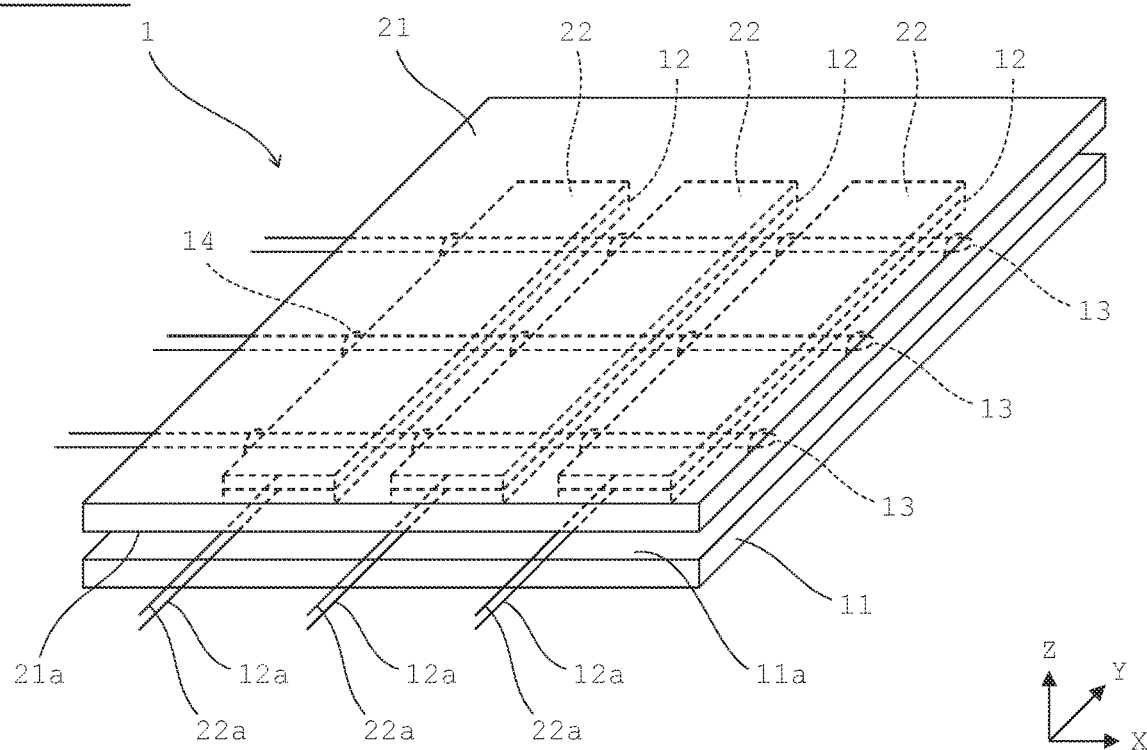
FIG. 2B is a perspective view schematically showing a load sensor of which assembly has been completed, according to Embodiment 1.

FIG. 2B is a perspective view schematically showing a state where the structure in FIG. 2A is set on the structure in FIG. 1B.

The structure shown in FIG. 2A is disposed from above (the Z-axis positive side) the structure shown in FIG. 1B. At this time, the base member 11 and the base member 21 are disposed such that: the opposing face 11a and the opposing face 21a face each other; and the electrically-conductive elastic bodies 12 and the electrically-conductive elastic bodies 22 are superposed with each other. Then, outer peripheral four sides of the base member 21 are connected to the outer peripheral four sides of the base member 11 with a silicone rubber-based adhesive, a thread, or the like, whereby the base member 11 and the base member 21 are fixed to each other. Accordingly, the three pairs of conductor wires 13 are sandwiched by the three electrically-conductive elastic bodies 12 and the three electrically-conductive elastic bodies 22. Thus, as shown in FIG. 2B, the load sensor 1 is completed.

Figure 3A:
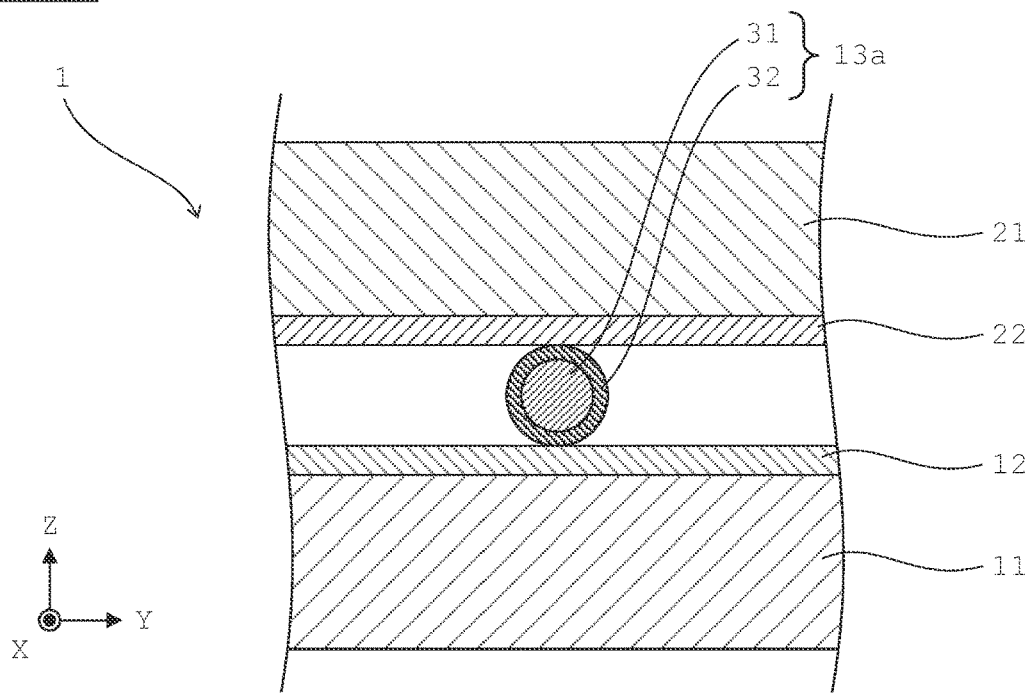
FIG. 3A and FIG. 3B are each a cross-sectional view schematically showing surroundings of a conductor wire viewed in an X-axis negative direction, according to Embodiment 1.
Figure 3B:
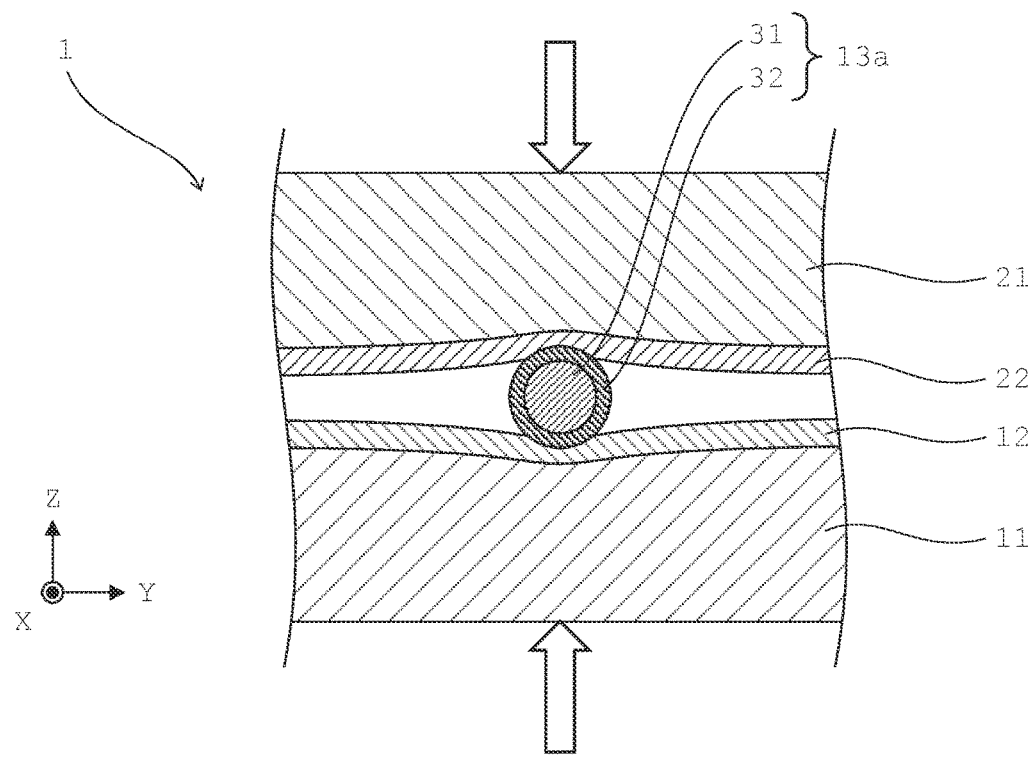

FIGS. 3A, 3B are each a cross-sectional view schematically showing surroundings of a conductor wire 13a viewed in the X-axis negative direction. FIG. 3A shows a state where no load is applied, and FIG. 3B shows a state where loads are applied.

As shown in FIGS. 3A, 3B, the conductor wire 13a is composed of an electrically-conductive member 31 and a dielectric body 32 formed on the electrically-conductive member 31. The electrically-conductive member 31 is a wire member having a linear shape.

The electrically-conductive member 31 is formed from an electrically-conductive metal material, for example. Other than this, the electrically-conductive member 31 may be composed of a core wire made of glass, and an electrically-conductive layer formed on the surface of the core wire. Alternatively, the electrically-conductive member 31 may be composed of a core wire made of resin, and an electrically-conductive layer formed on the surface of the core wire, for example. In Embodiment 1, the electrically-conductive member 31 is formed from aluminum. The dielectric body 32 has an electric insulation property, and is formed from a resin material, a ceramic material, a metal oxide material, or the like, for example.

Other than the above, as the electrically-conductive member 31, a valve action metal such as titanium (Ti), tantalum (Ta), niobium (Nb), zirconium (Zr), or hafnium (Hf); tungsten (W); molybdenum (Mo); copper (Cu); nickel (Ni); silver (Ag); gold (Au); or the like is used. The diameter of the electrically-conductive member 31 may be not less than 10 µm and not greater than 1500 µm, and may be not less than 50 µm and not greater than 800 µm, for example. Such a configuration of the electrically-conductive member 31 is preferable from the viewpoint of the resistance and the strength of the electrically-conductive member. The thickness of the dielectric body 32 is preferably not less than 5 nm and not greater than 100 µm, and can be selected as appropriate according to the design of the sensitivity of the sensor, etc.

As shown in FIG. 3A, when no load is applied, the force applied between the electrically-conductive elastic body 12 and the conductor wire 13a, and the force applied between the electrically-conductive elastic body 22 and the conductor wire 13a are substantially zero. From this state, as shown in FIG. 3B, when a load is applied in the upward direction to the lower face of the base member 11 and a load is applied in the downward direction to the upper face of the base member 21, the electrically-conductive elastic bodies 12, 22 are deformed by the conductor wire 13a.

As shown in FIG. 3B, when loads are applied, the conductor wire 13a is brought close to the electrically-conductive elastic bodies 12, 22 so as to be wrapped by the electrically-conductive elastic bodies 12, 22, and the contact area between the conductor wire 13a and the electrically-conductive elastic body 12, 22 increases. Accordingly, the capacitance between the electrically-conductive member 31 and the electrically-conductive elastic body 12 and the capacitance between the electrically-conductive member 31 and the electrically-conductive elastic body 22 change. Then, the capacitance in the region of the conductor wire 13a is detected, whereby the load applied to this region is calculated.

Figure 4:
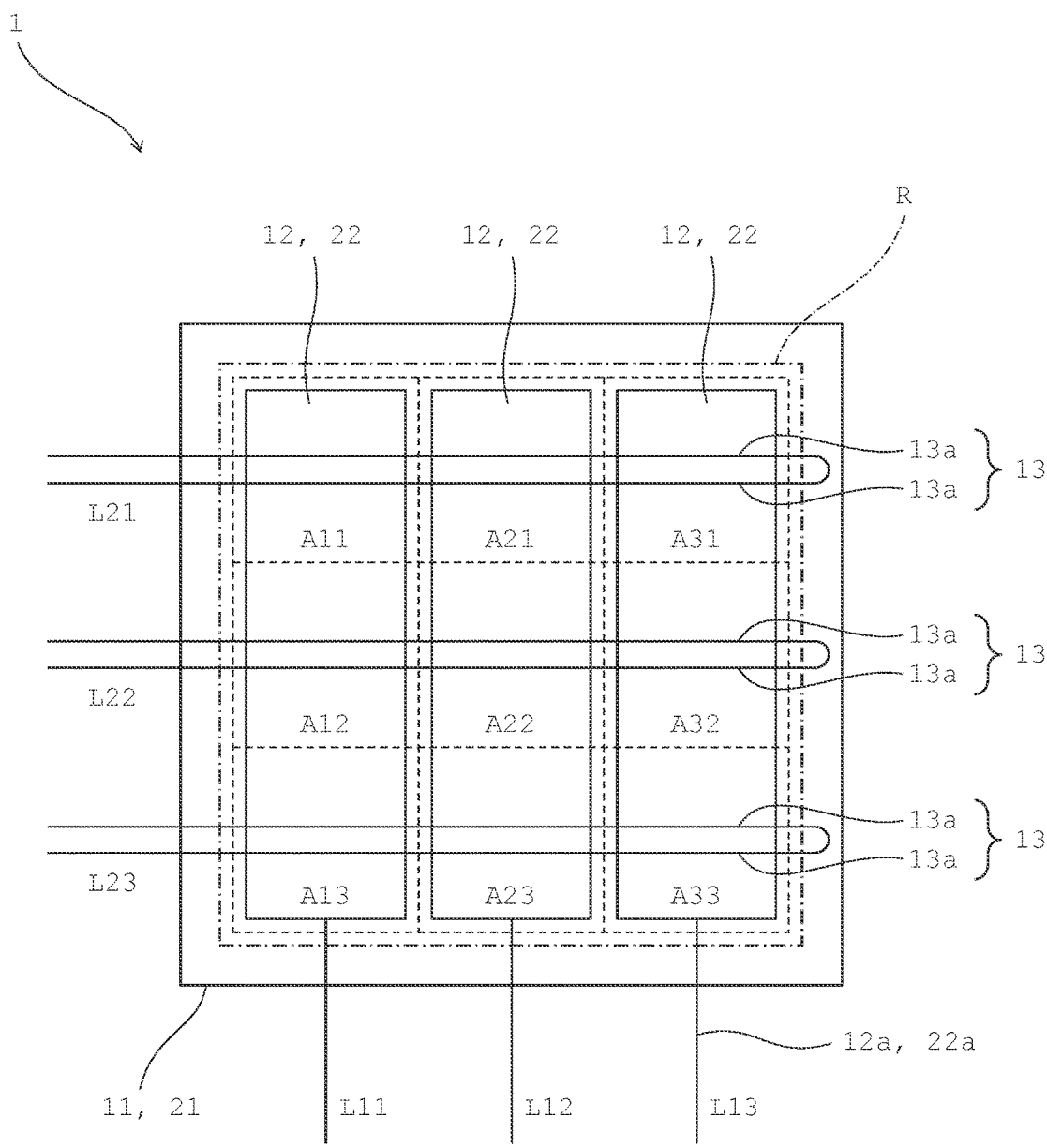
FIG. 4 is a plan view schematically showing the inside of the load sensor viewed in a Z-axis negative direction, according to Embodiment 1.

FIG. 4 is a plan view schematically showing the inside of the load sensor 1 viewed in the Z-axis negative direction. In FIG. 4, threads 14 are not shown, for convenience.

In a measurement region R of the load sensor 1, nine sensor parts arranged in the X-axis direction and the Y-axis direction are set. Specifically, nine regions obtained by dividing the measurement region R into three in the X-axis direction and dividing the measurement region R into three in the Y-axis direction are assigned as the nine sensor parts. The boundary of each sensor part is in contact with the boundary of a sensor part adjacent thereto. The nine sensor parts correspond to nine positions where the electrically-conductive elastic bodies 12, 22 and the pairs of conductor wires 13 cross each other. At these nine positions, nine sensor parts A11, A12, A13, A21, A22, A23, A31, A32, A33 in each of which capacitance changes in accordance with a load are formed.

Each sensor part includes electrically-conductive elastic bodies 12, 22 and a pair of conductor wires 13, and the pair of conductor wires 13 forms one pole (e.g., positive pole) for capacitance, and the electrically-conductive elastic bodies 12, 22 form the other pole (e.g., negative pole) for capacitance. That is, the electrically-conductive member 31 (see FIGS. 3A, 3B) in the pair of conductor wires 13 forms one electrode of the load sensor 1 (capacitance-type load sensor), the electrically-conductive elastic bodies 12, 22 form the other electrode of the load sensor 1 (capacitance-type load sensor), and the dielectric body 32 (see FIGS. 3A, 3B) in the pair of conductor wires 13 corresponds to a dielectric body that defines capacitance in the load sensor 1 (capacitance-type load sensor).

When a load is applied in the Z-axis direction to each sensor part, the pair of conductor wires 13 (two conductor wires 13a) is pressed against and sinks into the electrically-conductive elastic body 12, 22 due to the load. Accordingly, the contact area between the pair of conductor wires 13 and the electrically-conductive elastic body 12, 22 changes, and the capacitance between the pair of conductor wires 13 and the electrically-conductive elastic body 12, 22 changes.

End portions on the X-axis negative side of each pair of conductor wires 13, an end portion on the Y-axis negative side of each cable 12a, and an end portion on the Y-axis negative side of each cable 22a are connected to a detection circuit provided for the load sensor 1.

In FIG. 4, the cables 12a, 22a drawn from the three sets of electrically-conductive elastic bodies 12, 22 are indicated as lines L11, L12, L13, and the electrically-conductive members 31 in the three pairs of conductor wires 13 are indicated as lines L21, L22, L23. The positions at which the electrically-conductive elastic bodies 12, 22 connected to the line L11 cross the lines L21, L22, L23 are the sensor parts A11, A12, A13, respectively. The positions at which the electrically-conductive elastic bodies 12, 22 connected to the line L12 cross the lines L21, L22, L23 are the sensor parts A21, A22, A23, respectively. The positions at which the electrically-conductive elastic bodies 12, 22 connected to the line L13 cross the lines L21, L22, L23 are the sensor parts A31, A32, A33, respectively.

When a load is applied to the sensor part A11, the contact area between the pair of conductor wires 13 and the electrically-conductive elastic body 12, 22 increases in the sensor part A11. Therefore, when the capacitance between the line L11 and the line L21 is detected, the load applied to the sensor part A11 can be calculated. Similarly, in another sensor part as well, when the capacitance between two lines crossing each other in the other sensor part is detected, the load applied to the other sensor part can be calculated.

Meanwhile, as shown in FIGS. 3A, 3B, when the dielectric body 32 is formed so as to cover the periphery of the electrically-conductive member 31, the contact area between the dielectric body 32 and the electrically-conductive elastic body 12, 22 does not linearly increase in accordance with increase in the load. As a result, the relationship between the load and the capacitance is defined by a curved wave shape as indicated by a solid line in FIG. 5. In FIG. 5, a point PO indicates an inflection point where, when a load is applied to a sensor part, the electrically-conductive elastic body 22 on the upper side and the electrically-conductive elastic body 12 on the lower side start to come into contact with each other around the conductor wire 13a. When a load is to be obtained from the value of the capacitance, a curve of an inner portion relative to point PO is used. However, as shown in FIG. 5, this portion has a curved wave shape. Therefore, when the load is obtained from the value of the capacitance, this wave shape needs to be taken into consideration. This causes a problem that the process of detecting the load becomes complicated.

Here, when the capacitance of a sensor part is defined as C, the permittivity of vacuum is defined as $\varepsilon_0$, the relative permittivity of the dielectric body 32 is defined as $\varepsilon_r$, the contact area between the electrically-conductive elastic body 12, 22 and the dielectric body 32 is defined as S, and the thickness of the dielectric body 32 is defined as d, the capacitance C is calculated by formula (1) below.

$$C = \varepsilon_0 \cdot \varepsilon_r \cdot S/d \quad (1)$$

The inventors focused on the fact that the capacitance C changes in accordance with the values of $\varepsilon_r$, S, and d as shown in Formula (1) above, and considered that, when the values of $\varepsilon_r$, S, and d are adjusted, the form representing the relationship between the capacitance and the load can be set to a linear form.

In the present embodiment, out of the values of $\varepsilon_r$, S, and d, the contact area S is focused on, and the load sensor 1 is configured as shown in FIG. 6A to FIG. 7A. According to this configuration, the contact area S of the dielectric body 32 changes in association with increase in the load, such that the form of change in the capacitance between the electrically-conductive elastic body 12, 22 and the electrically-conductive member 31 associated with change in the load becomes close to that of a straight line. Accordingly, the load applied to the load sensor 1 can be detected in a simpler manner.

Figure 6A:
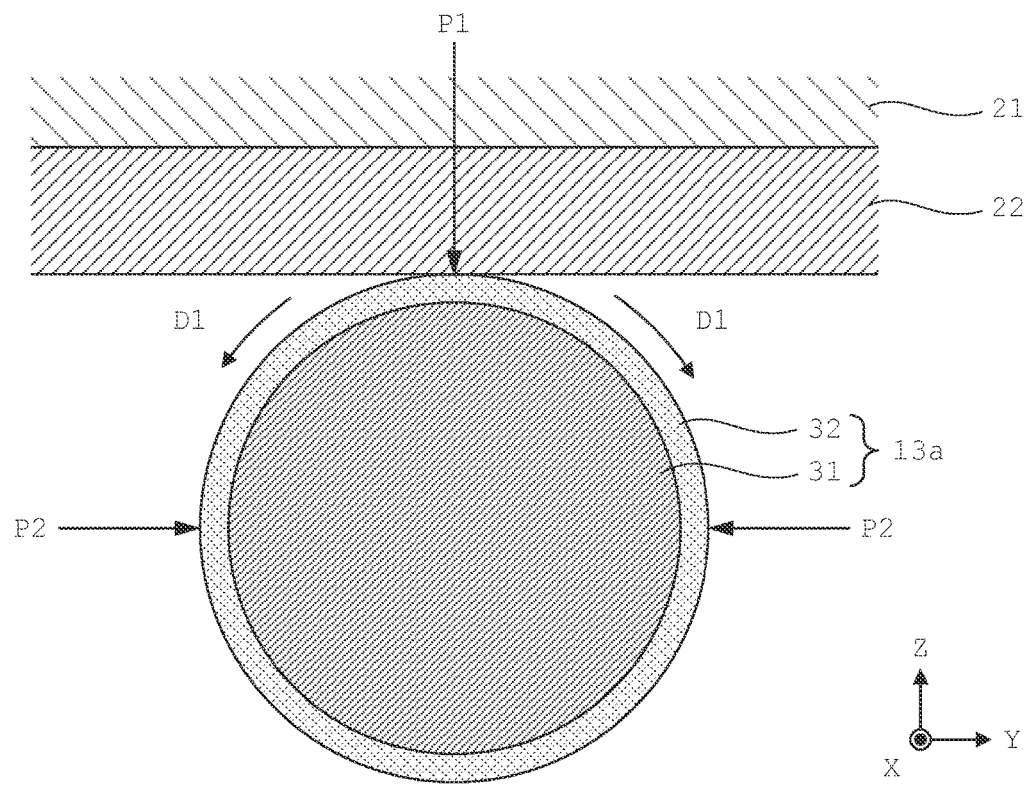
FIG. 6A is a diagram schematically showing a relationship between a dielectric body and an electrically-conductive elastic body in an initial state before a load is applied, according to Embodiment 1.
Figure 6B:
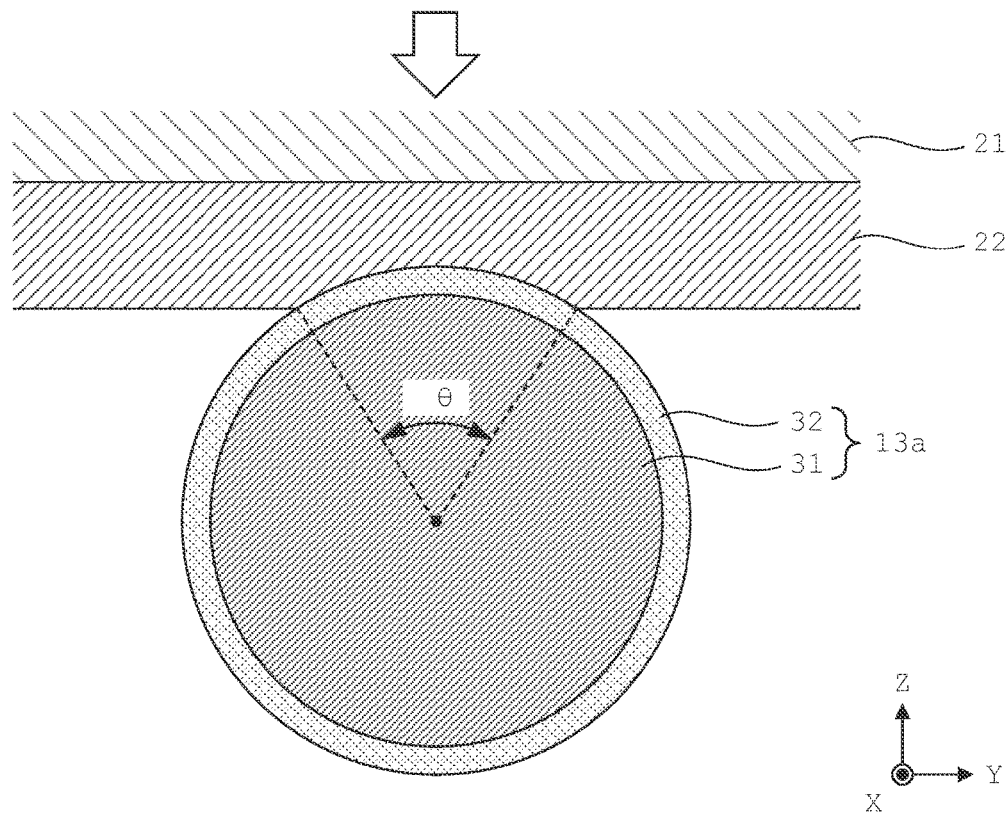
FIG. 6B is a diagram schematically showing a relationship between the dielectric body and the electrically-conductive elastic body in a state where a load is applied, according to Embodiment 1.

FIG. 6A is a diagram schematically showing a relationship between the dielectric body 32 and the electrically-conductive elastic body 22 in a state where an initial state before a load is applied. FIG. 6B is a diagram schematically showing a relationship between the dielectric body 32 and the electrically-conductive elastic body 22 in a state where a load is applied. For convenience, FIGS. 6A, 6B show only the configuration on the electrically-conductive elastic body 22 side, and do not show the configuration on the electrically-conductive elastic body 12 side. However, on the electrically-conductive elastic body 12 side as well, a phenomenon similar to that on the electrically-conductive elastic body 22 side occurs in accordance with change in the load.

In FIG. 6A, D1 indicates the contact surface direction in which contact of the dielectric body 32 advances in association with increase in the load. In the initial state in FIG. 6A, out of the dielectric body 32 formed around the electrically-conductive member 31, only the position (the position at the most Z-axis positive side) of the dielectric body 32 where the electrically-conductive member 31 and the electrically-conductive elastic body 22 are closest to each other is in contact with the electrically-conductive elastic body 22. Then, when a load is applied to the load sensor 1, contact between the dielectric body 32 and the electrically-conductive elastic body 22 advances in the contact surface direction D1 while the electrically-conductive elastic body 22 is deformed, as shown in FIG. 6B. $\theta$ in FIG. 6B defines the contact range in the circumferential direction between the dielectric body 32 and the electrically-conductive elastic body 22, in terms of an angle (hereinafter, referred to as "contact angle") in the circumferential direction. The contact angle $\theta$ increases in association with increase in the load.

Here, the dielectric body 32 is formed from alumina (aluminum oxide), for example. The dielectric body 32 formed from alumina is formed, through anodization (alumite treatment), on the surface of the electrically-conductive member 31 formed from aluminum. Accordingly, a film of an oxide (alumina) of aluminum is formed on the surface of the electrically-conductive member 31. Anodization (alumite treatment) is performed by applying an appropriate voltage (1 to 500 V) under a condition of 0° C. to 80° C. while using an organic acid solution or an inorganic acid solution of sulfuric acid, oxalic acid, phosphoric acid, boric acid, or the like.

At this time, through adjustment of the condition of the anodization, a plurality of pores 33 described later are formed on the dielectric body 32 formed on the surface of the electrically-conductive member 31. The pores 33 include micropores, microcracks, or the like, for example. The diameter of each pore 33 is not less than 1 nm and not greater than 100 nm, for example. Through adjustment of the condition of the anodization, the density of the pores 33 is set to be, compared with that in a region in the vicinity of a first position P1 sandwiched by the electrically-conductive elastic body 22 and the electrically-conductive member 31 in the initial state before load application, lower in a region in the vicinity of a second position P2 away in the contact surface direction D1 from the first position P1. The second position P2 is, for example, the upper limit position in a range where the dielectric body 32 can come into contact with the electrically-conductive elastic body 22 during load application (the position most away from the first position P1 in the range).

During formation of the dielectric body 32 and the pores 33, for example, the electrically-conductive member 31 is immersed, by a half portion in the radial direction, into a treatment liquid that is used in the alumite treatment, and then the electrically-conductive member 31 is pulled up from the treatment liquid at a predetermined speed while the temperature and the voltage are adjusted. Accordingly, the dielectric body 32 is formed on the surface of the electrically-conductive member 31, and at the same time, the pores 33 are formed in the dielectric body 32 such that the density of the pores 33 is gradually changed in the contact surface direction D1.

FIG. 7A is a side view schematically showing a configuration of the conductor wire 13a viewed in the Y-axis negative direction. FIG. 7A also shows an enlarged view schematically showing the pores 33 formed in the dielectric body 32.

As shown in FIG. 7A, a large number of pores 33 are formed in the dielectric body 32. The pores 33 are formed in the dielectric body 32 such that the density of the pores 33 (degree of crowdedness) is decreased along the contact surface direction D1. Accordingly, along the contact surface direction D1, the surface area (hereinafter, referred to as "surface density") of the dielectric body 32 per unit area excluding the pores 33 is gradually increased. The density of the pores 33 is set through adjustment of the condition of the anodization (alumite treatment) when forming the dielectric body 32.

As shown in FIG. 6A, when the cross section of the electrically-conductive member 31 is circular, if the surface density of the dielectric body 32 is uniform over the entire periphery thereof, the contact area between the dielectric body 32 and the electrically-conductive elastic body 22 rapidly increases in association with increase in the load, in a range where the load is small. Meanwhile, the contact area gently increases in association with increase in the load, in a range where the load is large. In this case, change in the capacitance associated with change in the load becomes sharp in a range where the load is small, and change in the capacitance associated with change in the load becomes gentle in a range where the load is large.

In contrast, as described above, when a plurality of pores 33 are formed in the dielectric body 32, and the surface density of the dielectric body 32 is set to be higher in a region in the vicinity of the second position P2 than in a region in the vicinity of the first position P1, change in the capacitance can be suppressed in a range where the load is small because the change amount of the contact area, between the dielectric body 32 and the electrically-conductive elastic body 22, which changes according to a predetermined load width is small. Meanwhile, change in the capacitance can be increased in a range where the load is large because the change amount of the contact area, between the dielectric body 32 and the electrically-conductive elastic body 22, which changes according to a predetermined load width is large. Accordingly, the state of change in the contact area associated with change in the load can be made close to a linear state. As a result, the relationship between the load and the capacitance can be made close to a linear relationship.

<Effects of Embodiment 1>

According to Embodiment 1, the following effects are exhibited.

As described above, the contact area between the dielectric body 32 and the electrically-conductive elastic body 12, 22 changes in association with change in the load. Thus, as shown in a broken line in FIG. 5, the form of change in the capacitance between the electrically-conductive elastic body 22 and the electrically-conductive member 31 associated with change in the load is made close to that of a straight line. Therefore, when the value of the capacitance between the electrically-conductive elastic body 12, 22 and the electrically-conductive member 31 is measured and a simple process based on a proportionality is applied to the measured value of the capacitance, the load applied to the load sensor 1 can be appropriately detected. Accordingly, the load applied to the load sensor 1 can be detected in a simpler manner.

As shown in FIG. 7A, the dielectric body 32 has a plurality of pores 33 whose density is changed in the contact surface direction D1. Therefore, as described above, the state of change in the contact area associated with change in the load can be made close to a linear state. As a result, the relationship between the load and the capacitance can be made close to a linear relationship.

As shown in FIGS. 3A, 3B, the dielectric body 32 is set so as to cover the surface of the electrically-conductive member 31. According to this configuration, by merely covering the surface of the electrically-conductive member 31 by the dielectric body 32, it is possible to set the dielectric body 32 between the electrically-conductive elastic bodies 12, 22 and the electrically-conductive member 31.

As shown in FIGS. 3A, 3B, the electrically-conductive elastic body 12 is also disposed on the opposing face 11a of the base member 11, similar to the case of the opposing face 21a of the base member 21, and the contact area of the dielectric body 32 changes in association with increase in the load, such that the form of change in the capacitance between the electrically-conductive elastic body 12, 22 and the electrically-conductive member 31 associated with change in the load becomes close to that of a straight line. When the electrically-conductive elastic bodies 12, 22 are disposed on both the base members 11, 21, change in the capacitance due to change in the load can be made large when compared with a case where either one of the electrically-conductive elastic bodies 12, 22 is disposed, and the detection accuracy of the load can be increased. Further, since the contact area of the dielectric body 32 changes in association with increase in the load, such that the form of change in the capacitance between the electrically-conductive elastic body 12, 22 and the electrically-conductive member 31 associated with change in the load becomes close to that of a straight line, the load applied to the load sensor 1 can be detected accurately and in a simple manner.

<Modification of Embodiment 1>

In Embodiment 1, with the plurality of pores 33 in the dielectric body 32 formed as shown in FIG. 7A, the contact area of the dielectric body 32 with respect to the electrically-conductive elastic body 12, 22 changes in association with increase in the load. However, instead of the formation of the pores 33, the surface roughness of the dielectric body 32 may be adjusted in the contact surface direction D1, such that the surface density of the dielectric body 32 is changed.

FIG. 7B is a diagram schematically showing a cross section of the dielectric body 32 cut along a Y-Z plane.

In the present modification, the dielectric body 32 is formed from a resin material or the like, and is typically formed from urethane. After the dielectric body 32 is formed on the surface of the electrically-conductive member 31, the electrically-conductive member 31 covered by the dielectric body 32 is passed through a ring-shaped die having fine irregularities at the inner surface thereof. Then, the ring-shaped die is slid in the longitudinal direction of the electrically-conductive member 31, whereby fine grooves 34 are formed in the surface of the dielectric body 32. The density of the fine irregularities at the inner surface of the ring-shaped die is adjusted, such that the interval between the grooves 34 formed in the surface of the dielectric body 32 is increased along the contact surface direction D1, whereby the surface roughness of the surface of the dielectric body 32 is set. The surface roughness is defined by a depth $s1$, a pitch $s2$, a surface interval $s3$, etc., of each groove 34 formed in the surface of the dielectric body 32, for example. At this time, the depth s1, the pitch s2, and the surface interval s3 of each groove 34 are set such that the electrically-conductive elastic body 12, 22 does not enter the grooves 34 even when the dielectric body 32 and the electrically-conductive elastic body 12, 22 are in close contact with each other.

As a result of the surface roughness being set in this manner, the area corresponding to the surface interval s3 of the grooves 34 per unit area is set as the surface density of the dielectric body 32. In the present modification, the surface roughness of the surface of the dielectric body 32 is adjusted such that the surface density of the dielectric body 32 is gradually increased in the contact surface direction D1.

As described above, in the present modification, the surface density of the dielectric body 32 is set to be increased along the contact surface direction D1, and the surface density of the dielectric body 32 is set to be higher in the vicinity of the second position P2 than in the vicinity of the first position P1. Accordingly, similar to Embodiment 1 above, change in the capacitance can be suppressed in a range where the load is small because the change amount of the contact area, between the dielectric body 32 and the electrically-conductive elastic body 22, which changes according to a predetermined load width is small. Meanwhile, change in the capacitance can be increased in a range where the load is large because the change amount of the contact area, between the dielectric body 32 and the electrically-conductive elastic body 22, which changes according to a predetermined load width is large. Accordingly, the state of change in the contact area associated with change in the load can be made close to a linear state. As a result, the relationship between the load and the capacitance can be made close to a linear relationship.

The method for changing the contact area of the dielectric body 32 in the contact surface direction D1 is not limited to the method for changing the density of the pores 33 or the surface roughness. Another method, such as a method in which, for example, recesses or projections are formed at the surface of the dielectric body 32 and the interval of the recesses or projections is increased along the contact surface direction D1, may be adopted.

The change in the contact area need not necessarily be continuously changed in the contact surface direction D1, and may be changed stepwise in the contact surface direction D1.

Embodiment 2

In Embodiment 1 above, out of the values of the relative permittivity $\varepsilon_r$, the contact area S, and the thickness d regarding the dielectric body, only the contact area S is focused on, and the relationship between the load and the capacitance is made close to a linear relationship. In contrast, in Embodiment 2, with all of the values of $\varepsilon_r$, S, and d focused on, the relationship between the load and the capacitance is made close to a linear relationship.

FIG. 8A is a diagram schematically showing a relationship between the dielectric body 32 and the electrically-conductive elastic body 22 in an initial state before a load is applied, according to Embodiment 2. FIG. 8B is a diagram schematically showing a relationship between the dielectric body 32 and the electrically-conductive elastic body 22 in a state where a load is applied, according to Embodiment 2. For convenience, FIGS. 8A, 8B show only the configuration on the electrically-conductive elastic body 22 side, and do not show the configuration on the electrically-conductive elastic body 12 side. However, on the electrically-conductive elastic body 12 side as well, a phenomenon similar to that on the electrically-conductive elastic body 22 side occurs in accordance with change in the load.

In the configuration in FIG. 8A, the dielectric body 32 is composed of a dielectric bodies 32a, 32b. The dielectric body 32a is formed on the surface of the electrically-conductive member 31 in a range of a predetermined contact angle θ1, and the dielectric body 32b is formed on the surface of the electrically-conductive member 31 in a range larger than that of the contact angle θ1. The thickness of the dielectric body 32a is larger than the thickness of the dielectric body 32b. The relative permittivity of the dielectric body 32b is set to be higher than the relative permittivity of the dielectric body 32a.

The dielectric body 32a is formed from a resin, for example, and the dielectric body 32b is formed from a metal oxide, for example. For example, the dielectric body 32a is formed from urethane, and the dielectric body 32b is formed from alumina.

A cutout C1 is formed at the first position P1 of the dielectric body 32a. The cutout C1 is formed along the X-axis direction in the surface of the dielectric body 32a, and is sized such that the cutout C1 does not penetrate the dielectric body 32a in the thickness direction. For example, the cutout C1 is formed at least in a range where the electrically-conductive member 31 and the electrically-conductive elastic body 22 overlap each other in a plan view. Since the cutout C1 is formed, it is possible to suppress rapid increase in the contact area from that in the initial state before a load is applied, and it is possible to suppress rapid increase in the capacitance.

Similar to the dielectric body 32 shown in FIG. 7B, the dielectric body 32a has the grooves 34 formed in the surface thereof. That is, the surface roughness of the dielectric body 32a is adjusted such that the surface density of the dielectric body 32a is gradually increased along the contact surface direction D1. Therefore, similar to the case in FIG. 7B, in a range where the contact angle is θ1, change in the capacitance can be suppressed in a range where the load is small because the change amount of the contact area, between the dielectric body 32a and the electrically-conductive elastic body 22, which changes according to a predetermined load width is small. Meanwhile, change in the capacitance can be increased in a range where the load is large because the change amount of the contact area, between the dielectric body 32a and the electrically-conductive elastic body 22, which changes according to a predetermined load width is large.

Similar to the dielectric body 32 shown in FIG. 7A, the dielectric body 32b has the pores 33 formed in the surface thereof. The density of the pores 33 is gradually decreased along the contact surface direction D1, and the surface density of the dielectric body 32b is gradually increased along the contact surface direction D1. Accordingly, similar to the case in FIG. 7A, in a range greater than that of the contact angle θ1, change in the capacitance can be suppressed in a range where the load is small because the change amount of the contact area, between the dielectric body 32b and the electrically-conductive elastic body 22, which changes according to a predetermined load width is small. Meanwhile, change in the capacitance can be increased in a range where the load is large because the change amount of the contact area, between the dielectric body 32b and the electrically-conductive elastic body 22, which changes according to a predetermined load width is large.

Figure 9A:
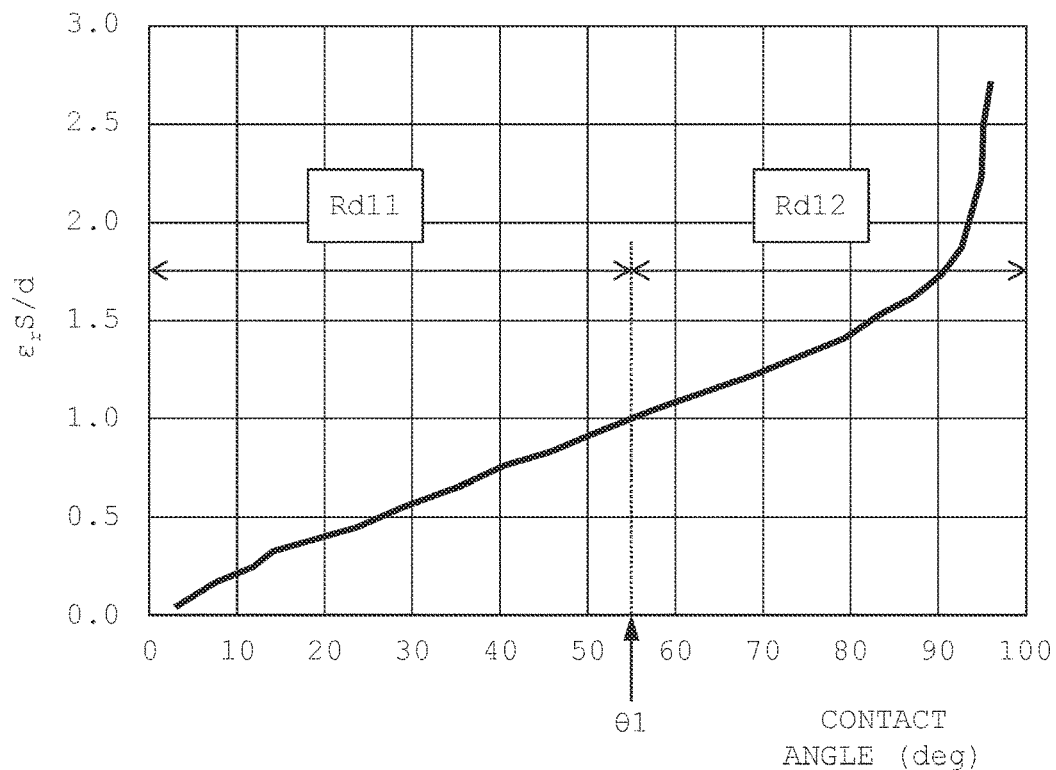
FIG. 9A is a graph showing a relationship between a contact angle θ and the value of $\varepsilon_r \cdot S/d$, according to Embodiment 2.
Figure 9B:
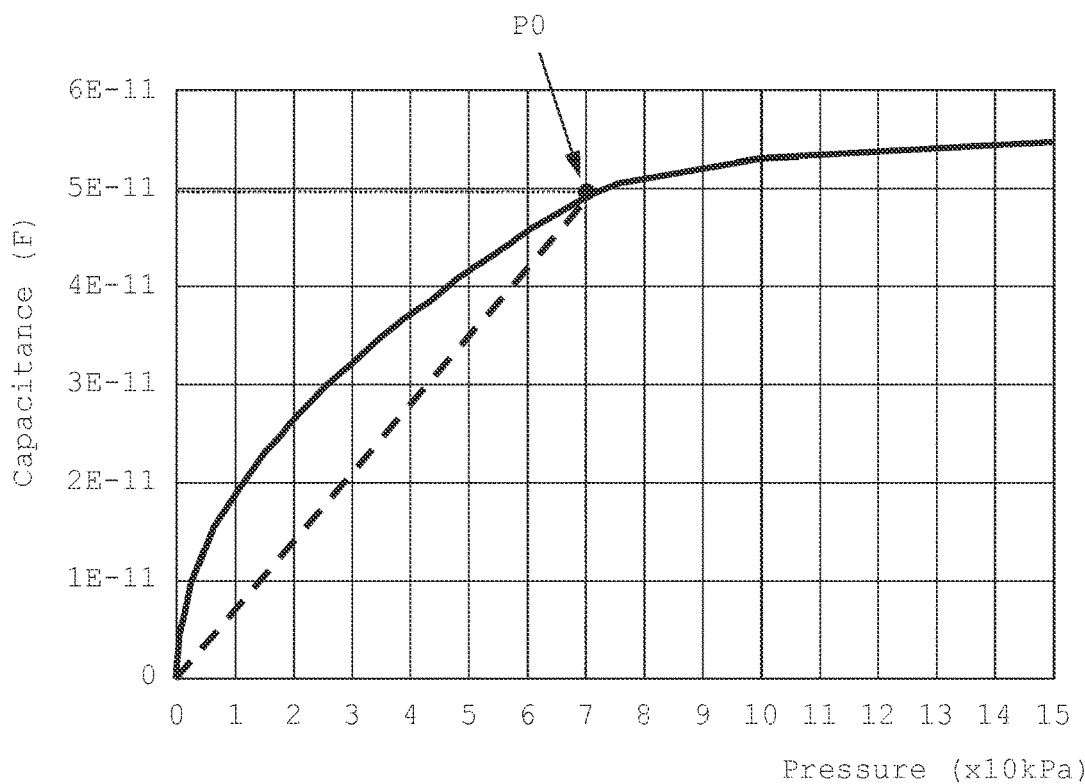
FIG. 9B is a graph showing a relationship between pressure and capacitance, according to Embodiment 2.

FIG. 9A is a graph showing a relationship between the contact angle θ and the value of $\varepsilon_r \cdot S/d$. FIG. 9B is a graph showing a relationship between the pressure and the capacitance.

In FIG. 9A, the contact angle θ1 (see FIGS. 8A, 8B) is set to about 55°. In the load sensor 1 in this case, at about 90° of the contact angle, the electrically-conductive elastic body 22 on the upper side and the electrically-conductive elastic body 12 on the lower side come into contact with each other. An angle range Rd11 is a range where the contact angle is 0° to θ1, and an angle range Rd12 is a range where the contact angle θ1 is not smaller than θ1.

In the angle range Rd11, $\varepsilon_r/d$ is set to 1, and the surface density is changed from 0% to 100% along the contact surface direction D1. At the contact angle of about 0°, since the cutout C1 is formed at the position corresponding to the first position P1 as shown in FIGS. 8A, 8B, the surface density is 0%. In the angle range Rd12, $\varepsilon_r/d$ is set to 3, and the surface density is changed from 33% to 100% along the contact surface direction D1. When the value of $\varepsilon_r/d$ and the value of the surface density are changed in this manner, the value of $\varepsilon_r \cdot S/d$ can be linearly set, up to a contact angle (90°) where the upper and lower electrically-conductive elastic bodies 12, 22 come into contact with each other.

When the value of $\varepsilon_r \cdot S/d$ is linearly set as shown in FIG. 9A, the curve representing the relationship between the pressure and the capacitance can be set to have a linear shape from the point where the load is 0 to the point PO, as indicated by a broken line in FIG. 9B. In FIG. 9B, the point PO corresponds to a state where the upper and lower electrically-conductive elastic bodies 12, 22 come into contact with each other around the conductor wire 13a, i.e., a state at about 90° in FIG. 9A.

<Effects of Embodiment 2>

According to Embodiment 2, the following effects are exhibited.

The dielectric body 32a is provided with the cutout C1 in an initial contact region (the first position P1). Accordingly, it is possible to suppress rapid increase in the contact area in a range where the load is small, and it is possible to suppress rapid increase in the capacitance in a range where the load is small. Therefore, in a range where the load is small, the relationship between the load and the capacitance can be made close to a linear relationship in a simpler manner.

The relative permittivity of the dielectric body 32 is changed in the contact surface direction D1 in association with increase in the load. That is, in the dielectric body 32, the relative permittivity of the dielectric body 32b positioned in a range larger than that of the contact angle θ1 is higher than the relative permittivity of the dielectric body 32a positioned in the range of the contact angle θ1. Thus, when the relative permittivity of the dielectric body 32 as well as the contact area are adjusted in the contact surface direction D1, the form of change in the capacitance between the electrically-conductive elastic body 12, 22 and the electrically-conductive member 31 associated with change in the load can be more smoothly and accurately made close to that of a straight line.

The materials of the dielectric body 32 are made different in the contact surface direction D1, whereby the relative permittivity of the dielectric body 32 is changed in the contact surface direction D1. That is, the dielectric body 32 is composed of the dielectric body 32a formed from urethane, and the dielectric body 32b formed from alumina which has a greater relative permittivity than that of urethane. Therefore, the form of change in the capacitance between the electrically-conductive elastic body 12, 22 and the electrically-conductive member 31 associated with change in the load can be smoothly made close to that of a straight line.

The thickness of the dielectric body 32a is larger than the thickness of the dielectric body 32b. That is, the thickness of the dielectric body 32 is changed in the contact surface direction D1. The capacitance per unit area due to the dielectric body 32 is in inverse proportion to the thickness. Therefore, when the thickness of the dielectric body 32a is further adjusted in this manner, the form of change in the capacitance between the electrically-conductive elastic body 12, 22 and the electrically-conductive member 31 associated with change in the load can be further smoothly and accurately made close to that of a straight line.

<Modification 1 of Embodiment 2>

In Embodiment 2, as shown in FIGS. 8A, 8B, the dielectric body 32 is composed of four (two pairs of) dielectric bodies. However, the dielectric body 32 may be composed of another number of dielectric bodies. In the present modification, the dielectric body 32 is composed of eight dielectric bodies 32a, 32b, 32c, and 32d (four pairs). Further, in the present modification, the form of the curve representing the relationship between the pressure and the capacitance is made close to that of two straight lines having slopes different from each other.

FIG. 10 is a diagram schematically showing a relationship between the dielectric body 32 and the electrically-conductive elastic body 22 in an initial state before a load is applied, according to the present modification. For convenience, FIG. 10 shows only the configuration on the electrically-conductive elastic body 22 side.

In the configuration in FIG. 10, the dielectric body 32a is formed on the surface of the electrically-conductive member 31 in a range not larger than that of a contact angle θ2, the dielectric body 32b is formed on the surface of the electrically-conductive member 31 in a range larger than that of the contact angle θ2 and not larger than that of a contact angle θ3, the dielectric body 32c is formed on the surface of the electrically-conductive member 31 in a range larger than that of the contact angle θ3 and not larger than that of a contact angle θ4, and the dielectric body 32d is formed on the surface of the electrically-conductive member 31 in a range larger than that of the contact angle θ4.

The thicknesses of the dielectric bodies 32a, 32c are equal to each other, and the thicknesses of the dielectric bodies 32b, 32d are equal to each other. The thickness of the dielectric bodies 32a, 32c is larger than the thickness of the dielectric bodies 32b, 32d. The relative permittivities of the dielectric bodies 32a, 32c are equal to each other, and the relative permittivities of the dielectric bodies 32b, 32d are equal to each other. The relative permittivity of the dielectric bodies 32b, 32d is higher than the relative permittivity of the dielectric bodies 32a, 32c.

The dielectric body 32a, 32c is formed from a resin, for example, and the dielectric body 32b, 32d is formed from a metal oxide, for example. For example, the dielectric body 32a, 32c is formed from urethane, and the dielectric body 32b, 32d is formed from alumina. Similar to FIGS. 8A, 8B, the cutout C1 is formed at the first position P1 of the dielectric body 32a.

Similar to the dielectric body 32 shown in FIG. 7B, the dielectric body 32a, 32c has the grooves 34 formed in the surface thereof. That is, the surface roughness of the dielectric body 32a, 32c is adjusted such that the surface density of the dielectric body 32a, 32c is gradually increased along the contact surface direction D1. Therefore, similar to the case in FIG. 7B, in the range where the contact angle is θ2 and the range where the contact angle is from θ3 to θ4, change in the capacitance can be increased because the change amount of the contact area, between the dielectric body 32a and the electrically-conductive elastic body 22, which changes according to a predetermined load width is increased in accordance with increase in the load.

Similar to the dielectric body 32 shown in FIG. 7A, the dielectric body 32b, 32d has the pores 33 formed in the surface thereof. The surface density of the dielectric body 32b is gradually increased along the contact surface direction D1. Accordingly, similar to the case in FIG. 7A, in the range where the contact angle is θ2 to θ3 and in the range where the contact angle is larger than θ4, change in the capacitance can be increased because the change amount of the contact area, between the dielectric body 32b and the electrically-conductive elastic body 22, which changes according to a predetermined load width is increased in accordance with increase in the load.

Figure 11A:
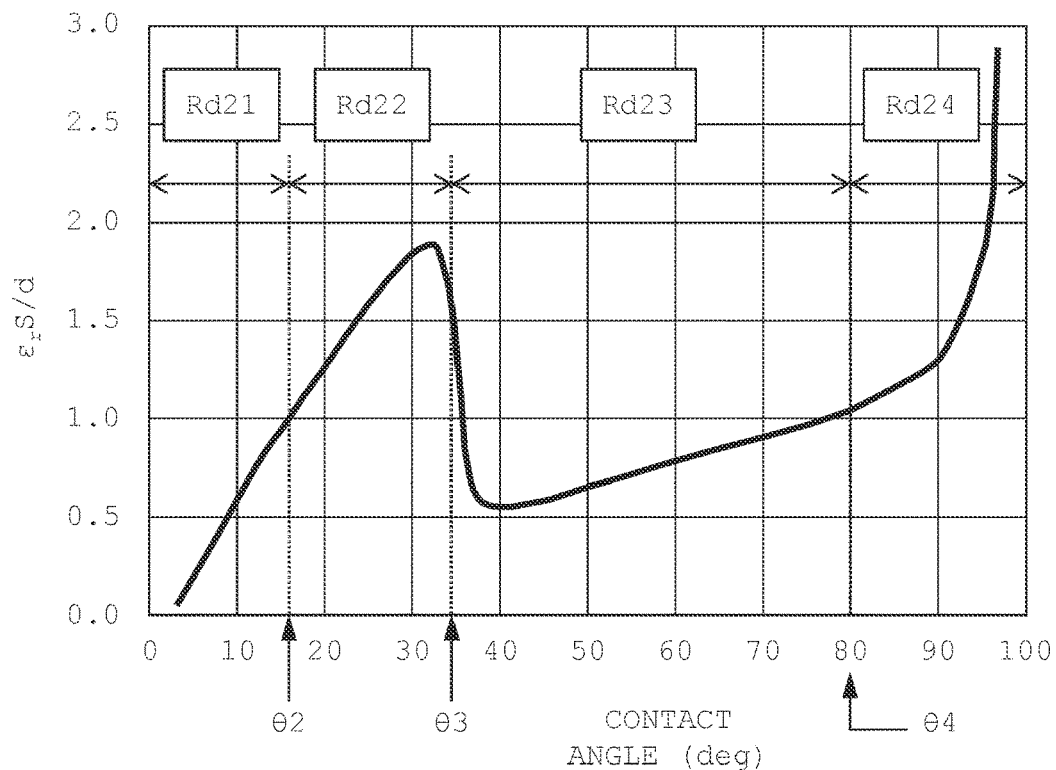
FIG. 11A is a graph showing a relationship between the contact angle θ and the value of $\varepsilon_r \cdot S/d$, according to Modification 1 of Embodiment 2.
Figure 11B:
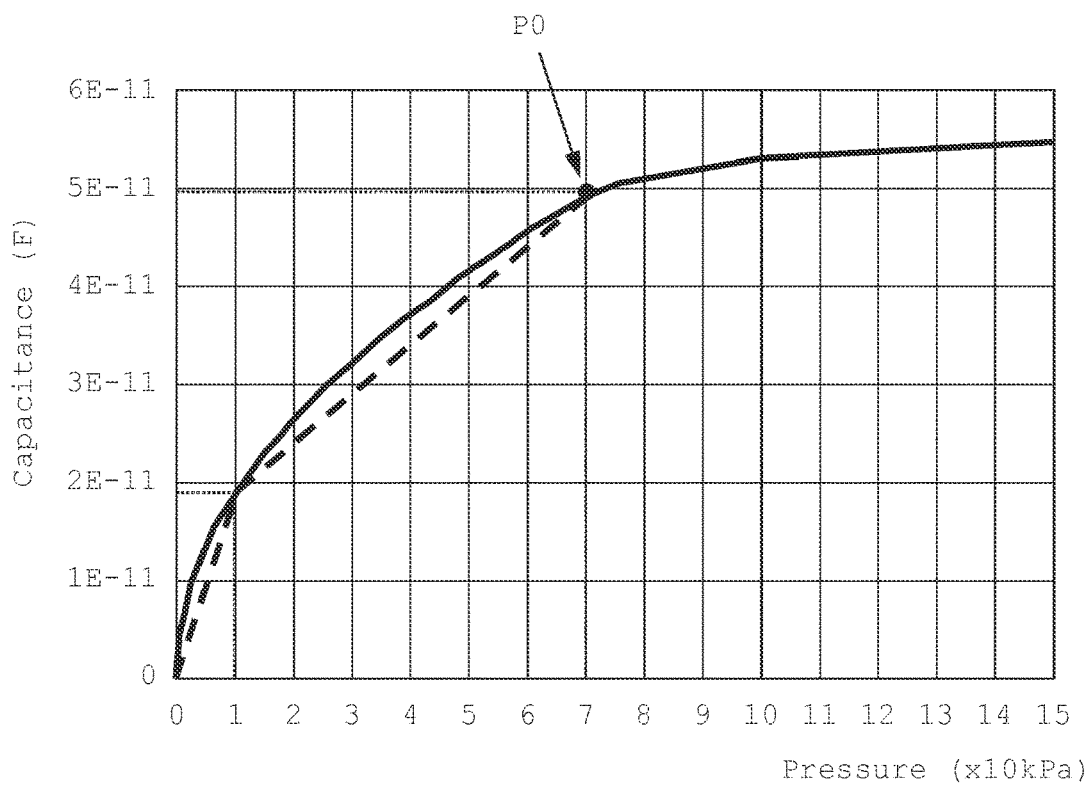
FIG. 11B is a graph showing a relationship between pressure and capacitance, according to Modification 1 of Embodiment 2.

FIG. 11A is a graph showing a relationship between the contact angle θ and the value of $\varepsilon_r \cdot S/d$. FIG. 11B is a graph showing a relationship between the pressure and the capacitance.

In FIG. 11A, the contact angle θ2, θ3, and θ4 (see FIG. 10) are set to about 16°, about 35°, and about 80°, respectively. In the load sensor 1 in this case, at about 90° of the contact angle, the electrically-conductive elastic body 22 on the upper side and the electrically-conductive elastic body 12 on the lower side come into contact with each other. An angle range Rd21 is a range where the contact angle is 0° to θ2, and an angle range Rd22 is a range where the contact angle is larger than θ2 and not larger than θ3. An angle range Rd23 is a range where the contact angle is larger than θ3 and not larger than θ4, and an angle range Rd24 is a range where the contact angle is larger than θ4.

In the angle ranges Rd21, Rd23, $\varepsilon_r/d$ is set to 1, and in the angle ranges Rd22, Rd24, $\varepsilon_r/d$ is set to 3. In the angle range Rd21, the surface density is changed from 0% to 100% along the contact surface direction D1. In the angle range Rd22, the surface density is changed from 33% to 66% along the contact surface direction D1. In the angle range Rd23, the surface density is changed from 50% to 100% along the contact surface direction D1. In the angle range Rd24, the surface density is changed from 33% to 100% along the contact surface direction D1.

When the value of $\varepsilon_r \cdot S/d$ is set as shown in FIG. 11A, the form of the curve representing the relationship between the pressure and the capacitance can be made close to that of two straight lines having slopes different from each other, from the point where the load is 0 to the point P0, as indicated by a broken line in FIG. 11B.

<Effects of Modification 1 of Embodiment 2>

According to the present modification, the following effects are exhibited.

As indicated by the broken line in FIG. 11B, the form of change in the capacitance between the electrically-conductive elastic body 12, 22 and the electrically-conductive member 31 associated with change in the load is made close to that of two straight lines. Therefore, in this case as well, when the value of the capacitance between the electrically-conductive elastic body 12, 22 and the electrically-conductive member 31 is measured, and a simple process based on a proportionality is applied to the measured value of the capacitance, the load applied to the load sensor 1 can be appropriately detected. Accordingly, the load applied to the load sensor 1 can be detected in a simpler manner.

<Modification 2 of Embodiment 2>

In Embodiment 2, as shown in FIGS. 8A, 8B, the dielectric body 32 is composed of the dielectric bodies 32a, 32b having relative permittivities different from each other, whereby the relative permittivity of the dielectric body 32 is changed in the contact surface direction D1. However, the relative permittivity of the dielectric body 32 may be changed in the contact surface direction D1 by another method. In the present modification, the dielectric body 32 includes a filler 35, whereby the relative permittivity of the dielectric body 32 is changed in the contact surface direction D1.

FIG. 12 is a diagram schematically showing a relationship between the dielectric body 32 and the electrically-conductive elastic body 22 in an initial state before a load is applied, according to the present modification. For convenience, FIG. 12 shows only the configuration on the electrically-conductive elastic body 22 side.

In the configuration in FIG. 12, the dielectric body 32 is formed from a resin or a metal oxide, for example. The dielectric body 32 is formed from urethane or alumina, for example. The dielectric body 32 includes the filler 35 composed of a plurality of particles. The filler 35 is Au (gold), Ag (silver), Cu (copper), C (carbon), or a resin, for example. When the dielectric body 32 is formed from a material other than alumina, the filler 35 may be alumina. In the present modification, the filler 35 is included in the dielectric body 32 such that the density of the filler 35 is changed in the contact surface direction D1. In the present modification, the density of the filler 35 is adjusted such that the relative permittivity of the dielectric body 32 is gradually increased in the contact surface direction D1.

Further, in the dielectric body 32, the pores 33 shown in FIG. 7A or the grooves 34 shown in FIG. 7B are formed with the density thereof adjusted in the contact surface direction D1, whereby the surface density of the dielectric body 32 is gradually increased along the contact surface direction D1.

As described above, according to the present modification, the density of the filler 35 is changed in the contact surface direction D1, whereby the relative permittivity of the dielectric body 32 is increased in the contact surface direction D1. Accordingly, in the present modification as well, the form representing the relationship between the load and the capacitance can be made close to that of a straight line.

The thickness of the dielectric body 32 may be changed so as to be gradually decreased in the contact surface direction D1. In this case, the capacitance per unit area due to the dielectric body 32 is gradually increased in the contact surface direction D1. Therefore, through further adjustment of the thickness of the dielectric body 32 in this manner, the form of change in the capacitance between the electrically-conductive elastic body 12, 22 and the electrically-conductive member 31 associated with change in the load can be further smoothly and accurately made close to that of a straight line. The thickness of the dielectric body 32 may be changed stepwise in the contact surface direction D1.

Embodiment 3

In Embodiments 1, 2 and the modifications above, the dielectric body 32 is disposed on the surface of the electrically-conductive member 31. However, in Embodiment 3, a dielectric body is formed on the surface of the electrically-conductive elastic body 12, 22.

Figure 13A:
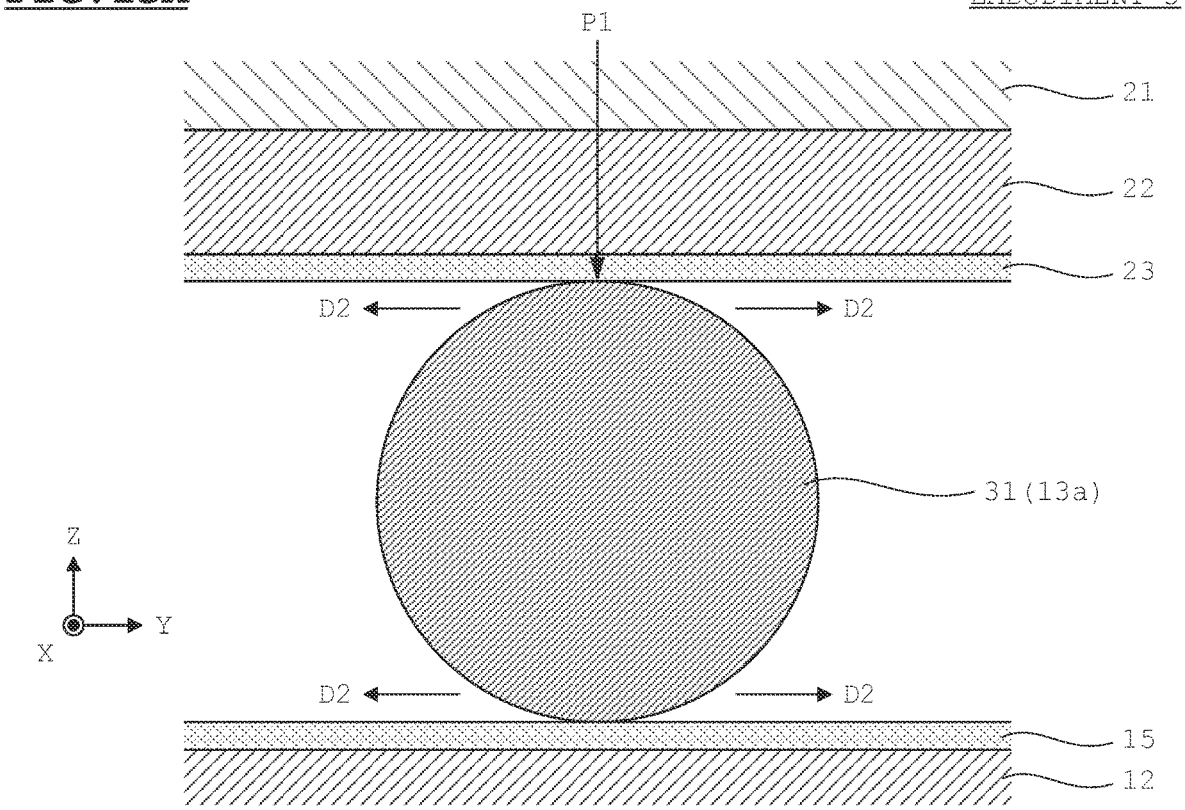
FIG. 13A is a diagram schematically showing a relationship between the dielectric body and the electrically-conductive elastic body in an initial state before a load is applied, according to Embodiment 3.
Figure 13B:
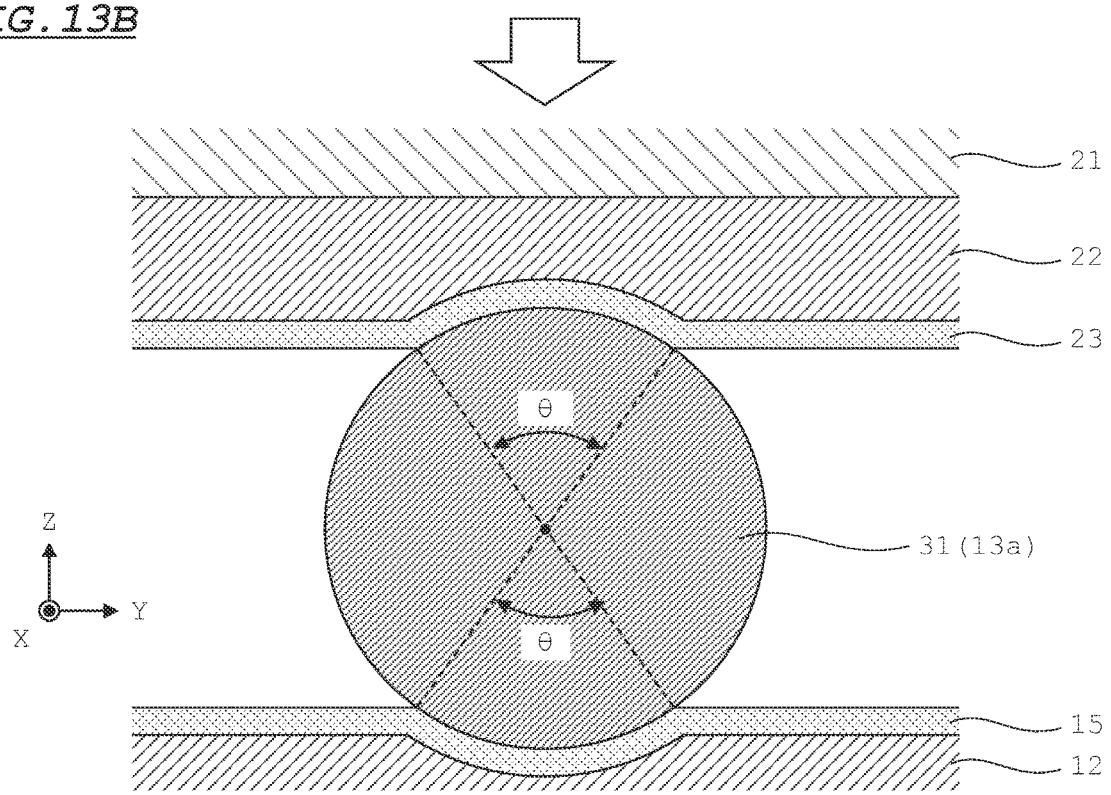
FIG. 13B is a diagram schematically showing a relationship between the dielectric body and the electrically-conductive elastic body in a state where a load is applied, according to Embodiment 3.

FIG. 13A is a diagram schematically showing a relationship between dielectric bodies 15, 23 and the electrically-conductive member 31 in an initial state before a load is applied, according to Embodiment 3. FIG. 13B is a diagram schematically showing a relationship between the dielectric bodies 15, 23 and the electrically-conductive member 31 in a state where a load is applied, according to Embodiment 3.

As shown in FIGS. 13A, 13B, in Embodiment 3, the dielectric bodies 15, 23 are respectively formed on the surfaces of the electrically-conductive elastic bodies 12, 22. In FIG. 13A, D2 indicates a contact surface direction in which contact of the dielectric bodies 15, 23 advances in association with increase in the load.

In the initial state in FIG. 13A, out of the regions of the dielectric bodies 15, 23, only the positions where the electrically-conductive member 31 and the electrically-conductive elastic bodies 12, 22 are closest to each other are in contact with the electrically-conductive member 31. Then, when a load is applied to the load sensor 1, contact between the dielectric bodies 15, 23 and the electrically-conductive member 31 advances in the contact surface direction D2 while the electrically-conductive elastic bodies 12, 22 are deformed, as shown in FIG. 13B. θ in FIG. 13B is a contact angle. The contact angle θ increases in association with increase in the load.

Here, similar to the dielectric body 32 of the modification of Embodiment 1, the dielectric body 15, 23 is formed from a resin material or the like, and is typically formed from urethane. The dielectric body 15, 23 has formed therein a plurality of grooves similar to the grooves 34 in the modification of Embodiment 1 above. In an initial state before load application, when the position of the dielectric body 15, 23 sandwiched by the electrically-conductive elastic body 12, 22 and the electrically-conductive member 31 is defined as the first position P1, the surface roughness of the dielectric body 15, 23 is adjusted such that the surface density of the dielectric body 15, 23 is gradually increased in the contact surface direction D2.

According to Embodiment 3, the surface density of the dielectric body 15, 23 is increased along the contact surface direction D2, and thus, similar to Embodiment 1 above, during load application, the state of change in the contact area associated with change in the load can be made close to a linear state. As a result, the relationship between the load and the capacitance can be made close to a linear relationship. Therefore, similar to Embodiment 1 above, when the value of the capacitance between the electrically-conductive elastic body 12, 22 and the electrically-conductive member 31 is measured, and a simple process based on a proportionality is applied to the measured value of the capacitance, the load applied to the load sensor 1 can be appropriately detected, and the load applied to the load sensor 1 can be detected in a simpler manner.

In the present embodiment as well, the dielectric body 15 may be configured such that a plurality of dielectric bodies having relative permittivities different from each other are disposed in the contact surface direction D2, and the dielectric body 23 may be configured such that a plurality of dielectric bodies having relative permittivities different from each other are disposed in the contact surface direction D2. The thickness of the dielectric body 15, 23 may be changed in the contact surface direction D2, and the cutout C1 may be formed at the first position P1 of the dielectric body 15, 23. Similar to Modification 2 of Embodiment 2, the dielectric body 15, 23 may include a filler, and the relative permittivity of the dielectric body 15, 23 may be adjusted in the contact surface direction D2 by the density of the filler.

Embodiment 4

In Embodiments 1, 2, and the modifications above, the electrically-conductive elastic body is disposed on the electrically-conductive member 31 having a linear shape. However, in Embodiment 4, the electrically-conductive elastic body is disposed on an electrically-conductive member having a spherical surface shape.

FIG. 14A is a plan view schematically showing a configuration of the load sensor 1 viewed in the Z-axis negative direction, according to Embodiment 4. FIG. 14B is a diagram schematically showing a cross section along a Y-Z plane of the load sensor 1, according to Embodiment 4. In FIG. 14A, for convenience, only a base member 41 and an electrically-conductive member 42 are shown.

The load sensor 1 includes the base member 41, the electrically-conductive member 42, a dielectric body 43, a base member 44, and an electrically-conductive elastic body 45. The base member 41, 44 has a square shape when viewed in the Z-axis direction, and is formed from a material similar to that of the base member 11, 21 in Embodiments 1, 2 and the modifications above. The electrically-conductive member 42 is a member that is electrically conductive and that has a spherical surface shape. The electrically-conductive member 42 has a dome shape composed of an upper part of a sphere, and is disposed on the upper face of the base member 41. The electrically-conductive member 42 is formed from a material similar to that of the electrically-conductive member 31 in Embodiments 1, 2, and the modifications above. The dielectric body 43 is disposed on the upper face of the electrically-conductive member 42, and is formed from a resin or a metal oxide. The dielectric body 43 is formed from urethane or alumina, for example. The electrically-conductive elastic body 45 is formed from a material similar to that of the electrically-conductive elastic body 12, 22 in Embodiments 1, 2, and the modifications above. The electrically-conductive elastic body 45 is disposed on the face on the Z-axis negative side of the base member 44.

In Embodiment 4, the first position P1 is the center position of the electrically-conductive member 42 viewed in the Z-axis direction. In Embodiment 4, the direction radially extending from the first position P1 along the curved surface of the electrically-conductive member 42 is the contact surface direction D1. In Embodiment 4, along the contact surface direction D1, a plurality of pores are formed in the dielectric body 43, similar to the pores 33 in Embodiment 1 above. The density of the pores of the dielectric body 43 is decreased along the contact surface direction D1. Accordingly, the surface density of the dielectric body 43 is increased along the contact surface direction D1.

In Embodiment 4 as well, when a load is applied from outside of the base member 41, 44, the electrically-conductive elastic body 45 is pressed against the electrically-conductive member 42 through the dielectric body 43. Accordingly, the capacitance between the dielectric body 43 and the electrically-conductive elastic body 45 changes in accordance with the load, and the load is calculated in accordance with the capacitance. In Embodiment 4, similar to Embodiment 1 above, since the surface density of the dielectric body 43 is increased along the contact surface direction D1, the form of the graph indicating the relationship between the load and the capacitance can be made close to that of a straight line.

In Embodiment 4 as well, similar to the modification of Embodiment 1 shown in FIG. 7B, grooves, instead of the pores, may be formed in the dielectric body 43 and the surface roughness of the dielectric body 43 may be adjusted such that the surface density of the dielectric body 43 is increased along the contact surface direction D1.

In Embodiment 4 as well, similar to Embodiment 2 and Modification 1 of Embodiment 2, the dielectric body 43 may be configured such that a plurality of dielectric bodies having relative permittivities different from each other are disposed in the contact surface direction D1, and the thickness of the dielectric body 43 may be changed in the contact surface direction D1. At the first position P1 of the dielectric body 43, a cutout having a circular shape may be formed. Further, similar to Modification 2 of Embodiment 2, the dielectric body 43 may include a filler, and the relative permittivity of the dielectric body 43 may be adjusted in the contact surface direction D1 by the density of the filler.

<Other Modifications>

In Embodiments 1 to 3 above, the dielectric body 32 is formed from one type of material in the thickness direction. However, the dielectric body 32 may have a structure in which two or more types of materials are laminated in the thickness direction. That is, the number of layers of the dielectric body 32 is not limited to 1, and may be 2 or greater. The number of the laminated dielectric bodies 32 may be different in accordance with the position in the contact surface direction D1, D2. For example, the number of laminates may be 2 in the vicinity of the first position P1, and the number of laminates may be 1 in the vicinity of the second position P2. Further, in Embodiment 4 above as well, the number of laminated dielectric bodies 43 is not limited to 1.

In Embodiments 1 to 4 above, the dielectric body formed from alumina is provided with pores in order to change the surface density in the contact surface direction D1, D2. However, the surface roughness of the surface of the dielectric body formed from alumina may be adjusted as shown in FIG. 7B, whereby the surface density may be changed in the contact surface direction D1, D2.

In Embodiments 1, 2 above, as a configuration for changing the contact area between the dielectric body 32 and the electrically-conductive elastic body 12, 22 in association with the load, the pores 33 or the grooves 34 are formed in the dielectric body 32. However, not limited thereto, without the pores 33 or the grooves 34 being formed in the dielectric body 32, pores or grooves may be formed in the electrically-conductive elastic body 12, 22 such that the density of the pores or grooves is decreased in the contact surface direction D2 (see FIGS. 13A, 13B). In this case, since the surface density of the electrically-conductive elastic body 12, 22 is increased in the contact surface direction D2, effects similar to those in the embodiments above can be exhibited. Similarly, in Embodiment 3 above as well, pores or grooves may be formed in the electrically-conductive elastic body 12, 22, and in Embodiment 4 as well, pores or grooves may be formed in the electrically-conductive elastic body 45.

In Embodiments 1 to 3 above, the cross-sectional shape of the electrically-conductive member 31 is a circular shape. However, the cross-sectional shape of the electrically-conductive member 31 is not limited to a circular shape, and may be another shape such as an ellipse, a pseudo circle, or the like. Further, the electrically-conductive member 31 may be implemented by a twisted wire obtained by twisting a plurality of electrically-conductive members.

In Embodiments 1 to 3 above, as shown in FIG. 2B, the load sensor 1 includes three pairs of conductor wires 13. However, the load sensor 1 only needs to include at least one pair of conductor wires 13. For example, the number of pairs of conductor wires 13 included in the load sensor 1 may be 1.

In Embodiments 1 to 3 above, as shown in FIG. 2B, the load sensor 1 includes three sets of electrically-conductive elastic bodies 12, 22 that oppose each other in the up-down direction. However, the load sensor 1 only needs to include at least one set of electrically-conductive elastic bodies 12, 22. For example, the number of sets of electrically-conductive elastic bodies 12, 22 included in the load sensor 1 may be 1.

In Embodiments 1 to 3 above, the electrically-conductive elastic bodies 22 on the base member 21 side may be omitted. In this case, each pair of conductor wires 13 is sandwiched by the electrically-conductive elastic bodies 12 on the base member 11 side and the opposing face 21a of the base member 21, and the pair of conductor wires 13 sinks into the electrically-conductive elastic bodies 12 in accordance with the load, whereby capacitance in each sensor part changes. When the electrically-conductive elastic bodies 22 on the base member 21 side are omitted, a sheet-shaped base member may be set instead of the base member 21.

In Embodiments 1 to 3 above, one pair of conductor wires 13 has a shape in which two conductor wires 13a arranged in the Y-axis direction are connected to each other at end portions in the X-axis direction. However, instead of one pair of conductor wires 13, one conductor wire may be disposed, or three or more conductor wires may be disposed. Further, in a plan view, the shape of the pair of conductor wires 13 need not necessarily be a linear shape and may be a wave shape.

In addition to the above, various modifications can be made as appropriate to the embodiments of the present invention without departing from the scope of the technical idea defined by the claims.

What is claimed is:

1. A load sensor comprising:
   a first base member and a second base member disposed so as to face each other;
   an electrically-conductive elastic body disposed on an opposing face of the first base member;
   an electrically-conductive member disposed between the second base member and the electrically-conductive elastic body;
   a dielectric body disposed between the electrically-conductive elastic body and the electrically-conductive member; and
   a component configured to change a contact area of the dielectric body in association with increase in a load, such that a form of change in capacitance between the electrically-conductive elastic body and the electrically-conductive member associated with change in the load is substantially linear,
   wherein the dielectric body has a plurality of pores whose density is changed in a contact surface direction in which contact of the dielectric body advances in association with increase in the load.

2. The load sensor according to claim 1, wherein a surface roughness of a surface of the dielectric body is adjusted such that a surface density of the dielectric body is changed in a contact surface direction in which contact of the dielectric body advances in association with increase in the load.

3. The load sensor according to claim 1, wherein the dielectric body is provided with a cutout in an initial contact region.

4. The load sensor according to claim 1, wherein a relative permittivity of the dielectric body is changed in a contact surface direction in which contact of the dielectric body advances in association with increase in the load.

5. The load sensor according to claim 4, wherein a material of the dielectric body is made different in the contact surface direction, whereby the relative permittivity of the dielectric body is changed in the contact surface direction.

6. The load sensor according to claim 4, wherein
the dielectric body includes a filler, and
a density of the filler is changed in the contact surface direction, whereby the relative permittivity of the dielectric body is changed in the contact surface direction.

7. The load sensor according to claim 1, wherein a thickness of the dielectric body is changed in a contact surface direction in which contact of the dielectric body advances in association with increase in the load.

8. The load sensor according to claim 1, wherein the electrically-conductive member is a wire member that is electrically conductive.

9. The load sensor according to claim 8, wherein the dielectric body is set so as to cover a surface of the wire member.

10. The load sensor according to claim 1, wherein the electrically-conductive member is a member that is electrically conductive and that has a spherical surface shape.

11. A load sensor comprising:
a first base member and a second base member disposed so as to face each other;
an electrically-conductive elastic body disposed on an opposing face of the first base member;
an electrically-conductive member disposed between the second base member and the electrically-conductive elastic body;
a dielectric body disposed between the electrically-conductive elastic body and the electrically-conductive member; and
a component configured to change a contact area of the dielectric body in association with increase in a load, such that a form of change in capacitance between the electrically-conductive elastic body and the electrically-conductive member associated with change in the load is substantially linear,
wherein a relative permittivity of the dielectric body is changed in a contact surface direction in which contact of the dielectric body advances in association with increase in the load.

12. The load sensor according to claim 11, wherein a material of the dielectric body is made different in the contact surface direction, whereby the relative permittivity of the dielectric body is changed in the contact surface direction.

13. The load sensor according to claim 11, wherein
the dielectric body includes a filler, and
a density of the filler is changed in the contact surface direction, whereby the relative permittivity of the dielectric body is changed in the contact surface direction.

14. The load sensor according to claim 11, wherein the dielectric body is provided with a cutout in an initial contact region.

15. The load sensor according to claim 11, wherein the electrically-conductive member is a wire member that is electrically conductive.

16. The load sensor according to claim 15, wherein the dielectric body is set so as to cover a surface of the wire member.

17. The load sensor according to claim 11, wherein the electrically-conductive member is a member that is electrically conductive and that has a spherical surface shape.

18. A load sensor comprising:
a first base member and a second base member disposed so as to face each other;
an electrically-conductive elastic body disposed on an opposing face of the first base member;
an electrically-conductive member disposed between the second base member and the electrically-conductive elastic body;
a dielectric body disposed between the electrically-conductive elastic body and the electrically-conductive member; and
a component configured to change a contact area of the dielectric body in association with increase in a load, such that a form of change in capacitance between the electrically-conductive elastic body and the electrically-conductive member associated with change in the load is substantially linear,
wherein a thickness of the dielectric body is changed in a contact surface direction in which contact of the dielectric body advances in association with increase in the load.

19. The load sensor according to claim 18, wherein the dielectric body is provided with a cutout in an initial contact region.

20. The load sensor according to claim 18, wherein the electrically-conductive member is a wire member that is electrically conductive.

* * * * *